(12) United States Patent
Toda

(10) Patent No.: US 12,399,316 B2
(45) Date of Patent: Aug. 26, 2025

(54) POLARIZATION MAINTAINING FIBER WITH ALIGNMENT FEATURES

(71) Applicant: Intel Corporation, Santa Clara, CA (US)

(72) Inventor: Asako Toda, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 741 days.

(21) Appl. No.: 17/553,227

(22) Filed: Dec. 16, 2021

(65) Prior Publication Data
US 2023/0194805 A1 Jun. 22, 2023

(51) Int. Cl.
*G02B 6/024* (2006.01)
*G02B 6/42* (2006.01)
*C03B 37/027* (2006.01)
*G02B 6/02* (2006.01)

(52) U.S. Cl.
CPC .......... *G02B 6/024* (2013.01); *G02B 6/4243* (2013.01); *C03B 37/02709* (2013.01); *C03B 2203/31* (2013.01); *G02B 6/021* (2013.01)

(58) Field of Classification Search
CPC .............. G02B 6/024; C03B 37/01217; C03B 37/02709; C03B 2203/30; C03B 2203/31; G01R 33/0327; G01R 33/091
See application file for complete search history.

(56) References Cited

U.S. PATENT DOCUMENTS

| | | | | |
|---|---|---|---|---|
| 4,395,270 A | * | 7/1983 | Blankenship | G02B 6/024 65/421 |
| 6,201,912 B1 | * | 3/2001 | Kempen | G01D 5/344 385/12 |
| 6,259,830 B1 | * | 7/2001 | Bhagavatula | G02F 1/3558 385/11 |
| 10,408,995 B1 | * | 9/2019 | Dong | G01J 3/0218 |
| 2003/0174985 A1 | * | 9/2003 | Eggleton | G02B 6/105 385/11 |

(Continued)

FOREIGN PATENT DOCUMENTS

| | | | |
|---|---|---|---|
| CN | 113916210 A | * | 1/2022 |
| JP | 62-245202 A | * | 10/1987 |

(Continued)

OTHER PUBLICATIONS

Z. Hileman et al. Development of a multimaterial optical fiber for fully distributed magnetic sensing applications. IEEE Sensors Letters, 6:1, art. No. 2500104, pp. 1-4, Jan. 2022 (https://doi.org/10.1109/LSENS.2021.3137640) (Year: 2022).*

(Continued)

*Primary Examiner* — Michael Stahl
(74) *Attorney, Agent, or Firm* — Schwabe, Williamson & Wyatt P.C.

(57) ABSTRACT

Embodiments disclosed herein include an optical fiber. In an embodiment, the optical fiber comprises a core and a cladding around the core. In an embodiment, a first rod is within the cladding and adjacent to the core. In an embodiment, the first rod comprises a magnetic material. In an embodiment, the optical fiber further comprises a second rod within the cladding and adjacent to the core, where the first rod and the second rod are on opposite sides of the core.

24 Claims, 22 Drawing Sheets

(56) References Cited

U.S. PATENT DOCUMENTS

2009/0080843 A1* 3/2009 Bookbinder ........... G02B 6/024
                                                          385/123
2011/0268399 A1* 11/2011 Berkey ............. C03B 37/01217
                                                          385/107
2024/0053415 A1*  2/2024 Hileman .............. G01R 33/091

FOREIGN PATENT DOCUMENTS

| JP | 2021-76632 A | * | 5/2021 |
| WO | WO 87/07255 A1 | * | 12/1987 |
| WO | WO 2021/187972 A1 | * | 9/2021 |
| WO | WO 2025/004171 A1 | * | 1/2025 |

OTHER PUBLICATIONS

L. Chen et al. Design and characterization of the heterogeneous integrated optical fiber with triple side nickel cores. 2024 ACP and IPOC, Beijing, China, Dec. 2024, pp. 1-3 (https://doi.org/10.1109/ACP/IPOC63121.2024.10810100) (Year: 2024).*

* cited by examiner

FIG. 1A  FIG. 1B

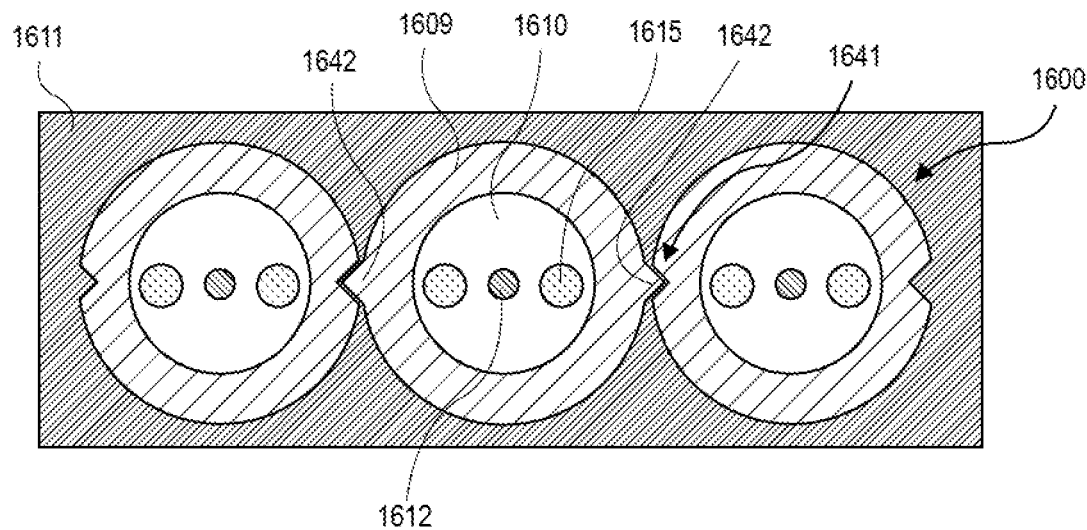
FIG. 16C
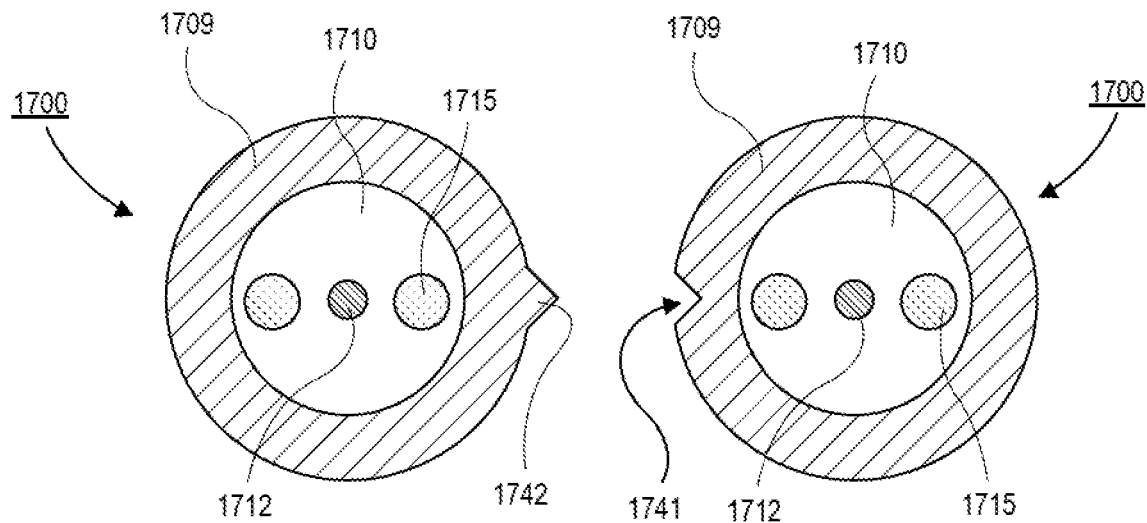
FIG. 17A　　　FIG. 17B

POLARIZATION MAINTAINING FIBER WITH ALIGNMENT FEATURES

TECHNICAL FIELD

Embodiments of the present disclosure relate to electronic packages, and more particularly to optoelectronic packages with polarization maintaining fibers with alignment features.

BACKGROUND

Photonics devices allow for high bandwidth signaling. Accordingly, photonics devices are being increasingly used as the communication architecture for advanced electronic packaging systems. In some instances, the photonics devices include an optical fiber that is optically coupled to a photonics integrated circuit (PIC). For example, the optical fiber may be placed in a V-groove on the PIC. For single mode fibers, the placement of the fiber into the V-groove is simplified since the fiber may have any rotational orientation.

However, in advanced photonics devices polarization maintaining fibers (PMFs) are used. By design, PMFs have a non-symmetric cross-section about all orientations. Particularly, a pair of stress rods are on opposite sides of a core. As such, the PMF is not uniform about different degrees of rotation. This is particularly problematic since the stress rods and the core need to be properly aligned in order to function properly. Accordingly, the PMFs need to be manually inserted into the V-groove while monitoring the PMF orientation. Due to the extra assembly complexity, PMFs are expensive to use, and are hindering silicon photonics from being used in consumer products.

BRIEF DESCRIPTION OF THE DRAWINGS

FIG. 1A is a cross-sectional illustration of an optical fiber with a core and a cladding, in accordance with an embodiment.

FIG. 1B is a cross-sectional illustration of polarization maintaining fiber (PMF) with a core and a pair of rods adjacent to the core, in accordance with an embodiment.

FIG. 16C is a cross-sectional illustration of a plurality of PMFs that are aligned with each other and surrounded by a mold layer, in accordance with an embodiment.

FIG. 17A is a cross-sectional illustration of a PMF with an alignment structure that comprises a protrusion, in accordance with an embodiment.

FIG. 17B is a cross-sectional illustration of a PMF with an alignment structure that comprises a groove, in accordance with an embodiment.

EMBODIMENTS OF THE PRESENT DISCLOSURE

Figure 1C:
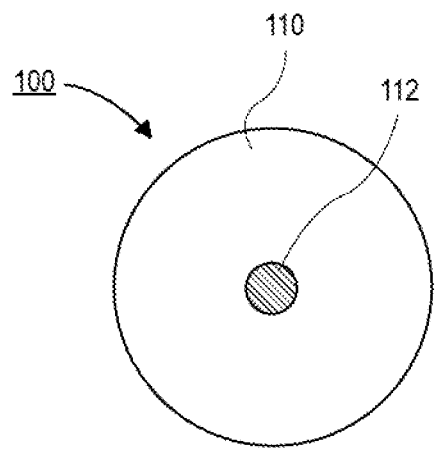
FIG. 1C is a plan view illustration of a photonics system with optical fibers from a fiber array unit (FAU) that are to be inserted into V-grooves, in accordance with an embodiment.
Figure 1C:
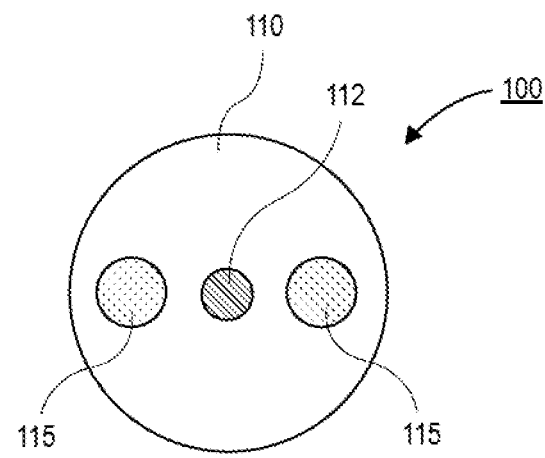
Figure 1C:
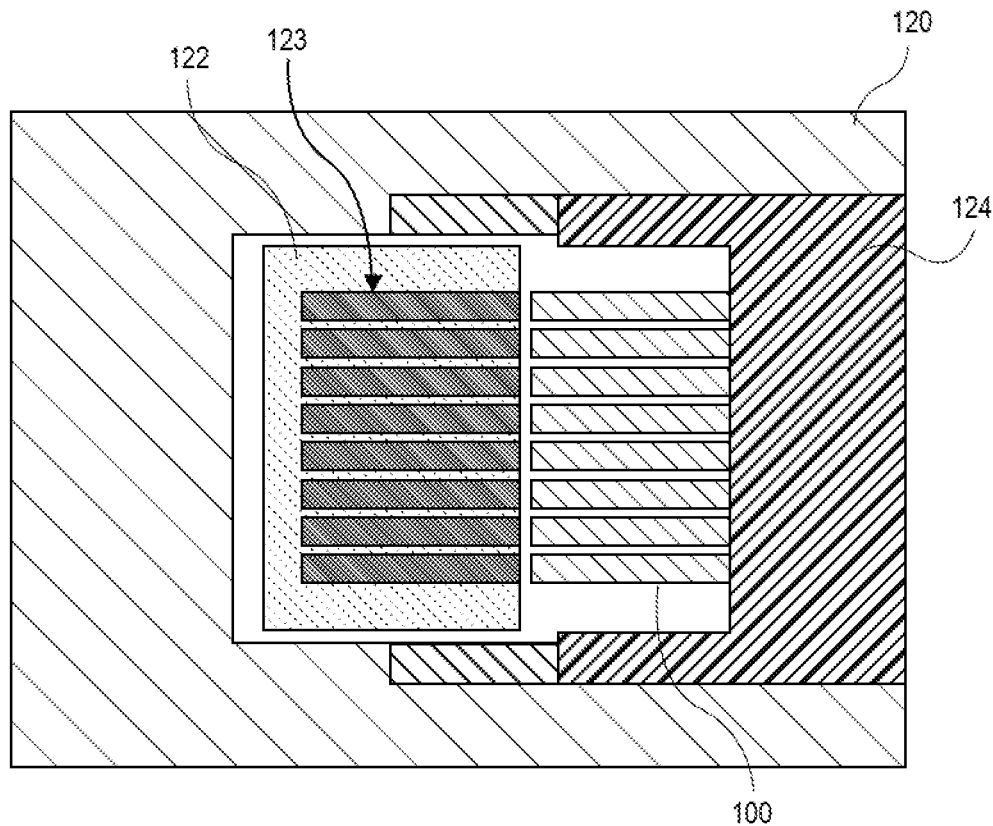

Described herein are optoelectronic packages with polarization maintaining fibers with alignment features, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

The most commonly used optical fiber in existing optical systems for optoelectronic packaging is a single mode fiber. A cross-sectional illustration of such a fiber 100 is shown in FIG. 1A. As shown, the fiber 100 comprises a core 112 and a cladding 110 surrounding the core 112. In an embodiment, the core 112 may comprise a glass material or any other suitable material for propagating optical signals. In order to improve the performance of optical systems, the use of polarization maintaining fibers (PMFs) have been proposed. PMFs work by intentionally introducing a systematic linear birefringence in the fiber 100, so that there are two well defined polarization modes which propagate along the fiber with distinct phase velocities.

An example of a PMF 100 is shown in FIG. 1B. As shown, the PMF 100 comprises a core 112 with a cladding 110. In addition to the core 112, a pair of rods 115 are provided within the cladding 110. The rods 115 may induce a stress in the PMF fiber 100. In some instances the rods 115 may be referred to as stress rods. Stress permanently induced in the PMF 100 will generate a stress birefringence.

The rods 115 are aligned with each other on opposite sides of the core 112. As used herein, rods 115 and cores 112 that are said to be aligned with each other refers to an orientation where a single linear line can be drawn that passes through a center point of all of the features. That is, in FIG. 1B, a single linear line can be drawn that passes through a center point of the first rod 115 on the left, a center point of the core 112, and a center point of the second rod 115 on the right. It is to be appreciated that manufacturing tolerances may result in the rods 115 and the core 112 being slightly offset from each other. For example, the center points of the rods 115 and the core 112 may be within approximately 10 μm of being perfectly aligned with each other. The rods 115 may be any suitable material. In some instances, the rods 115 may comprise boron trioxide ($B_2O_3$). In other instances, the rods 115 may comprise metallic materials.

PMFs maintain the linear polarization of linearly polarized light so long as the light is launched into the PMF aligned with one of the PMF's polarization modes. Accordingly, properly aligning the PMF is critical. As shown in FIG. 1C, a plan view illustration of an electronic package 120 with a photonics integrated circuit (PIC) 122 is shown. The PIC 122 may include a plurality of grooves 123 into which PMFs 100 from a fiber array unit 124 are inserted. In order to properly align the PMFs 100, each PMF is manually inserted into the groove 123 while monitoring the orientation of the PMF 100. Accordingly, assembly complexity is increased, which leads to an increase in the cost of using PMFs. The added cost and complexity makes it undesirable to use PMFs 100 unless absolutely necessary.

Accordingly, embodiments disclosed herein include PMF architectures that enable self-aligning the individual PMFs. Aligning the PMFs allows for the creation of fiber ribbons that maintain the necessary fiber orientation. The pigtail ends of the fiber ribbons can then be inserted into grooves of the PIC without needing to check the orientation of the fibers. In one embodiment, the fibers are self-aligned with a magnetic process. For example, one or both of the rods may be replaced with a magnetic material. The rods will then be magnetically attracted to each other and align in the proper orientations. In other embodiments, the PMFs may be inserted into a V-groove, and a magnetic field is applied to properly orient the PMFs. In yet another embodiment, the groove sidewalls include magnets or magnetic metals that are used to align the PMFs.

In yet another embodiment, housings may be secured to the ends of the PMFs. The PMFs are properly aligned within the housing and secured. The housing can then be inserted into a connector, and the alignment will persist. The housings may be attached to the PMFs with protrusion and groove architectures, or through the use of an adhesive.

In other embodiments, the PMFs may be fabricated with an outer cladding that includes a protrusion and/or a groove. The PMFs with protrusions couple with PMFs with the grooves, with the protrusions fitting into the groove. The protrusions and grooves are configured to properly align the PMFs when coupled together.

Figure 2A:
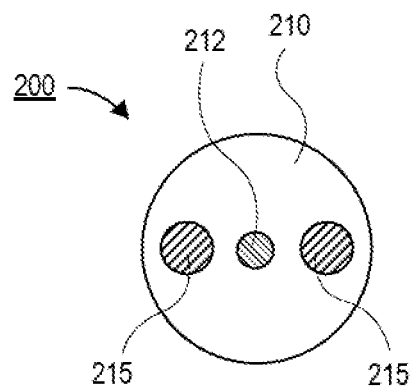
FIG. 2A is a cross-sectional illustration of a PMF with a pair of magnetic rods adjacent to the core, in accordance with an embodiment.

Referring now to FIG. 2A, a cross-sectional illustration of a PMF 200 is shown, in accordance with an embodiment. In an embodiment, the PMF 200 may comprise a core 212. The core 212 may comprise a glass material, though it is to be appreciated that other types of materials may also be used. As shown, the core 212 is surrounded by a cladding 210. In an embodiment, the diameter of the cladding 210 may be between approximately 50 μm and approximately 150 μm. The cladding 210 may be a polymer material.

In an embodiment, a pair of rods 215 may be provided in the cladding 210. The rods 215 may be on opposite sides of the core 212. In a particular embodiment, the rods 215 may be aligned with the core 212 so that a single linear line can be drawn that passes through center points of the two rods 215 and the core 212. The rods 215 may be substantially similar to each other. For example, a material composition and diameter of the two rods 215 may be substantially the same. In an embodiment, the rods 215 have diameters that are larger than a diameter of the core 212. In the illustrated embodiment, the rods 215 are shown as being substantially circular. However, it is to be appreciated that the rods 215 may have any cross-sectional shape suitable for PMF applications. For example, the rods 215 may be have a cross-sectional shape that is commonly referred to as a bow-tie configuration.

In an embodiment, the rods 215 may comprise a magnetic material. For example, the magnetic material may be a magnetic powder that is mixed in with a non-magnetic base material. The particles of the magnetic material may be smaller than the diameter of the rods 215 in order to not impact the stress distribution in the PMF 200. In a particular embodiment, the magnetic material may comprise nanoparticles, such as ferrite nanoparticles. In one embodiment, ferrite nanoparticles may be mixed with boron trioxide ($B_2O_3$).

Figure 2B:
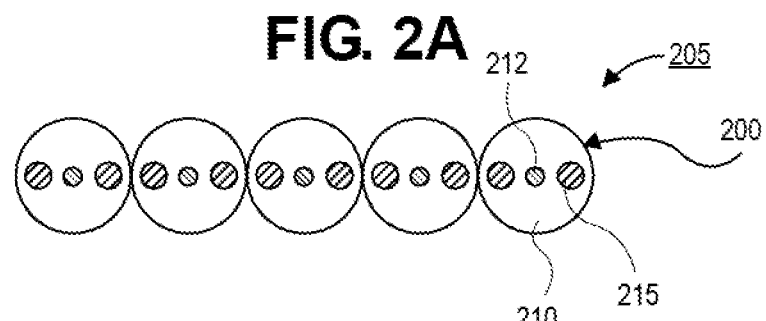
FIG. 2B is a cross-sectional illustration of a plurality of PMFs magnetically coupled to each other, in accordance with an embodiment.

Referring now to FIG. 2B, a cross-sectional illustration of an array 205 of PMFs 200 is shown, in accordance with an embodiment. As shown, each of the PMFs 200 may be substantially similar to the PMF 200 described above with respect to FIG. 2A. For example, the PMFs 200 may comprise a core 212 surrounded by a cladding 210. Rods 215 may be provided adjacent to the core 212 within the cladding 210. Since the rods 215 comprise magnetic material, the rods 215 become magnetically attracted to each other. As such, the PMFs 200 align laterally with each other in order to minimize the distances between rods 215 on neighboring PMFs 200. In the illustrated embodiment five PMFs 200 are shown. However, it is to be appreciated that any number of PMFs 200 may be included in the array 205.

Figure 3A:
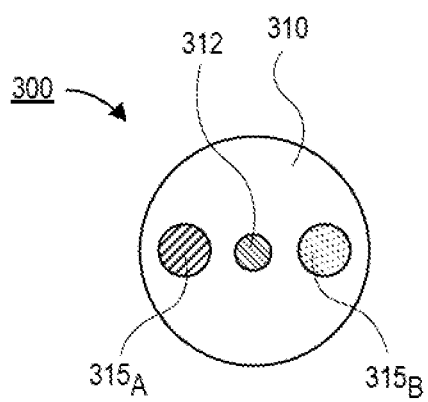
FIG. 3A is a cross-sectional illustration of a PMF with a magnetic rod and a metal rod adjacent to the core, in accordance with an embodiment.

Referring now to FIG. 3A, a cross-sectional illustration of a PMF 300 is shown, in accordance with an embodiment. In an embodiment, the PMF 300 may comprise a core 312. The core 312 may comprise a glass material, though it is to be appreciated that other types of materials may also be used. In an embodiment, the core 312 is surrounded by a cladding 310. The diameter of the cladding 310 may be between approximately 50 μm and approximately 150 μm. The cladding 310 may be a polymer material.

In an embodiment, a pair of rods 315 may be provided in the cladding 310. The rods 315 may be on opposite sides of the core 312. In a particular embodiment, the rods 315 may be aligned with the core 312 so that a single linear line can be drawn that passes through center points of the two rods 315 and the core 312. The diameter of the rods 315 may be substantially similar to each other. In an embodiment, the rods 315 have diameters that are larger than a diameter of the core 312. In the illustrated embodiment, the rods 315 are shown as being substantially circular. However, it is to be appreciated that the rods 315 may have any cross-sectional shape suitable for PMF applications.

In an embodiment, a first rod $315_A$ may comprise a magnetic material. For example, the magnetic material may be a magnetic powder that is mixed in with a non-magnetic base material. The particles of the magnetic material may be smaller than the diameter of the first rod $315_A$ in order to not impact the stress distribution in the PMF 300. In a particular embodiment, the magnetic material may comprise nanoparticles, such as ferrite nanoparticles. In one embodiment, ferrite nanoparticles may be mixed with boron trioxide ($B_2O_3$).

In an embodiment, a second rod $315_B$ may comprise a magnetic metal. Particularly, the magnetic material may be a material that is attracted to the magnetic material of the first rod $315_A$. For example, the second rod $315_B$ may comprise iron, nickel, cobalt, or the like. The magnetic component of the second rod $315_B$ may be a powder that is mixed with another material, such as boron trioxide ($B_2O_3$).

Figure 3B:
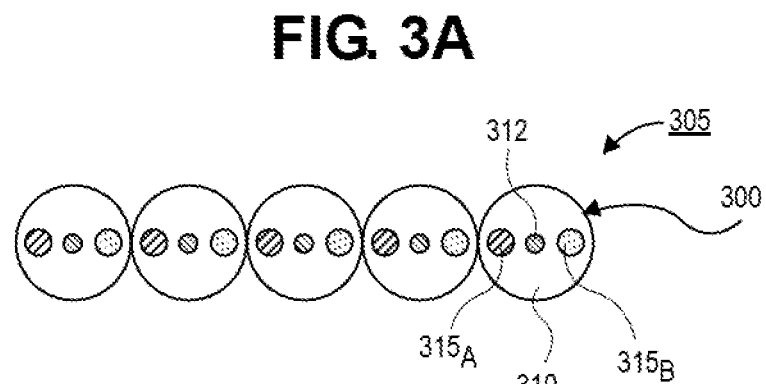
FIG. 3B is a cross-sectional illustration of a plurality of PMFs magnetically coupled to each other, in accordance with an embodiment.

Referring now to FIG. 3B, a cross-sectional illustration of an array 305 of PMFs 300 is shown, in accordance with an embodiment. The PMFs 300 in FIG. 3B may be substantially similar to the PMF 300 in FIG. 3A. As shown, the PMFs 300 are aligned with each other so that first rods $315_A$ are adjacent to second rods $315_B$ in neighboring PMFs 300. This minimizes the distance between the first rods $315_A$ and the second rods $315_B$. Such an embodiment is beneficial in that the handling of the PMFs 300 is made easier compared to the embodiment shown in FIG. 2A. This is because only one side is magnetic, and the PMFs do not stick to each other in every direction.

Figure 4:
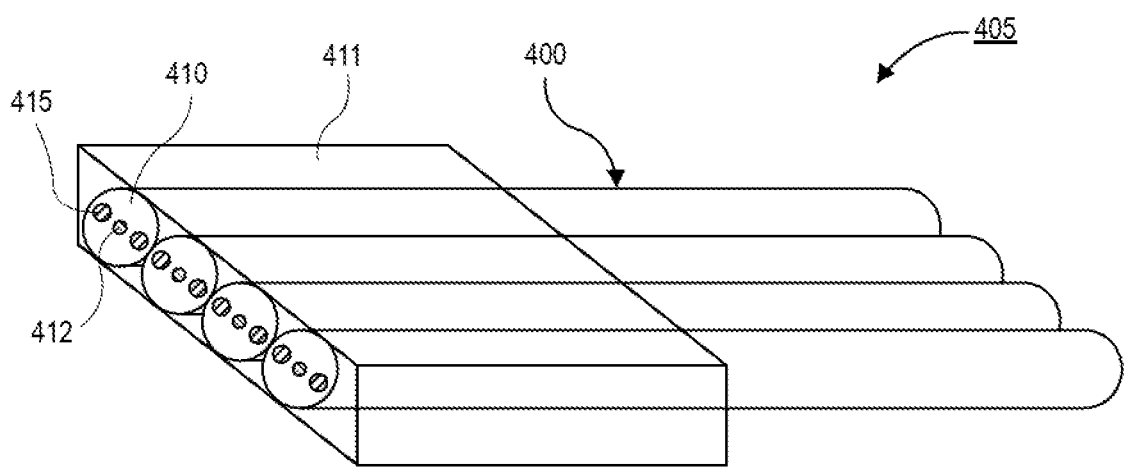
FIG. 4 is a perspective view illustration of a PMF ribbon with a molded end and a pigtail end, in accordance with an embodiment.

Referring now to FIG. 4, a perspective view illustration of an array 405 of PMFs 400 is shown, in accordance with an embodiment. In the illustrated embodiment, the PMFs 400 are substantially similar to the PMF 200 in FIG. 2A. That is, the PMFs 400 comprise a core 412 with a cladding 410. Rods 415 that are magnetic may be on opposite sides of the core 412. Though, it is to be appreciated that array 405 may alternatively have PMFs 400 that are similar to the PMF 300 in FIG. 3A. For example, the PMFs 400 may include a first rod 415 that is magnetic and a second rod 415 that is a metallic material that is attracted to the magnetic first rod 415. While four PMFs 400 are shown in the array 405, it is to be appreciated that any number of PMFs 400 may be included in the array 405.

In an embodiment, the array 405 may include a mold layer 411 that is around the PMFs 400. The mold layer 411 may bundle the array 405 of PMFs 400 into a ribbon-like architecture. Additionally, the mold layer 411 locks in the orientation of the PMFs 400 so that they do not rotate. As such, the pigtail end of the array 405 (i.e., the end of the array 405 not surrounded by the mold layer 411) can be inserted into grooves or the like with constrained PMFs 400 that are not free to rotate. Since the pigtail ends of the PMFs 400 cannot rotate, the PMFs 400 will be properly aligned when inserted into a groove or the like.

Figure 5A:
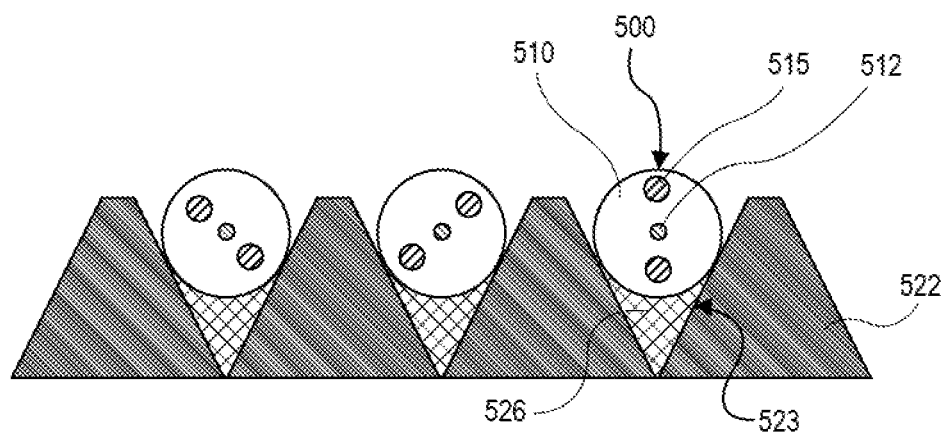
FIGS. 5A-5C are cross-sectional illustrations depicting a process for aligning PMFs in V-grooves by applying an electromagnetic field to the PMFs, in accordance with an embodiment.
Figure 5B:
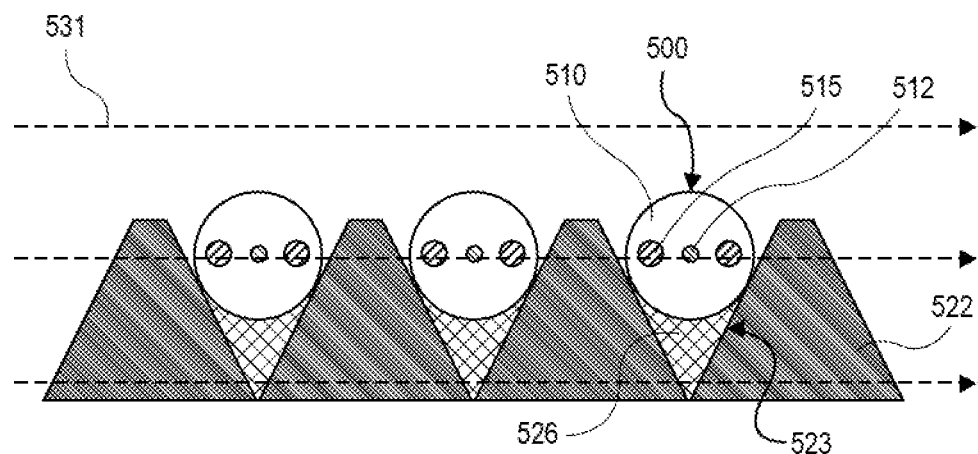
Figure 5C:
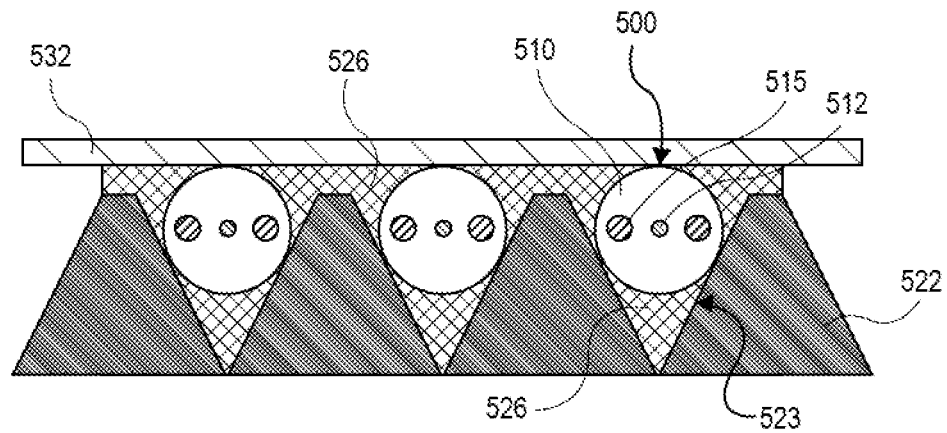

Referring now to FIGS. 5A-5C, a series of cross-sectional illustrations depicting a process for aligning PMFs 500 in grooves 523 is shown, in accordance with an embodiment. Referring now to FIG. 5A, a cross-sectional illustrations of a portion of a PIC 522 with grooves 523 is shown, in accordance with an embodiment. In an embodiment, the grooves 523 may be V-grooves, though grooves with other shapes may also be used in some embodiments. Additionally, while described as a PIC 522, it is to be appreciated that similar alignment processes may be implemented with grooves on other structures (e.g., on a fiber array unit (FAU) or the like).

In an embodiment, the PMFs 500 may each comprise a core 512 and a cladding 510 around the core 512. Rods 515 may be provided on opposite sides of the core 512 within the cladding 510. In an embodiment, the rods 515 comprise a magnetic material. In a particular embodiment, the PMFs 500 may be substantially similar to the PMFs 200 described above with respect to FIG. 2A. In an embodiment, the PMFs 500 may be over a curable adhesive 526 that is in the bottom of the grooves 523.

As shown in FIG. 5A, the PMFs 500 have non-uniform rotations within the grooves 523. That is, the PMFs 500 may be placed in the grooves 523 without any particular concern as to their orientation. Such an embodiment may occur when the PMFs 500 are not bundled (as is shown in FIG. 4). Instead, the PMFs 500 may be considered loose fibers. Additionally, the PMFs 500 may be far enough apart from each other so that the magnetic rods 515 do not initiate a self-aligning action, similar to what is shown in FIG. 2B.

Referring now to FIG. 5B, a cross-sectional illustration of the PIC 522 after the PMFs 500 are aligned is shown, in accordance with an embodiment. In an embodiment, the PMFs 500 may be aligned by applying an electro-magnetic field 531 over the PIC 522. The electro-magnetic field 531 interacts with the magnetic rods 515 and results in the PMFs 500 rotating to align with the electro-magnetic field 531. At this point in the process, the curable adhesive 526 is uncured, so the PMFs 500 are free to rotate within the grooves 523. As shown, the PMFs 500 are all aligned so that a single linear line can be drawn that passes through the center points of all of the cores 512 and the rods 515.

Referring now to FIG. 5C, a cross-sectional illustration of the PIC 522 after the PMFs 500 are secured in the grooves 523 is shown, in accordance with an embodiment. As shown, additional adhesive 526 may be applied around the top halves of the PMFs 500. A glass plate 532 may then be pressed down onto the PMFs 500. In an embodiment, the adhesive 526 may then be cured to lock the PMFs 500 in the proper orientation. In an embodiment, the adhesive 526 may be cured with a UV exposure, a temperature cure, or the like.

Figure 6A:
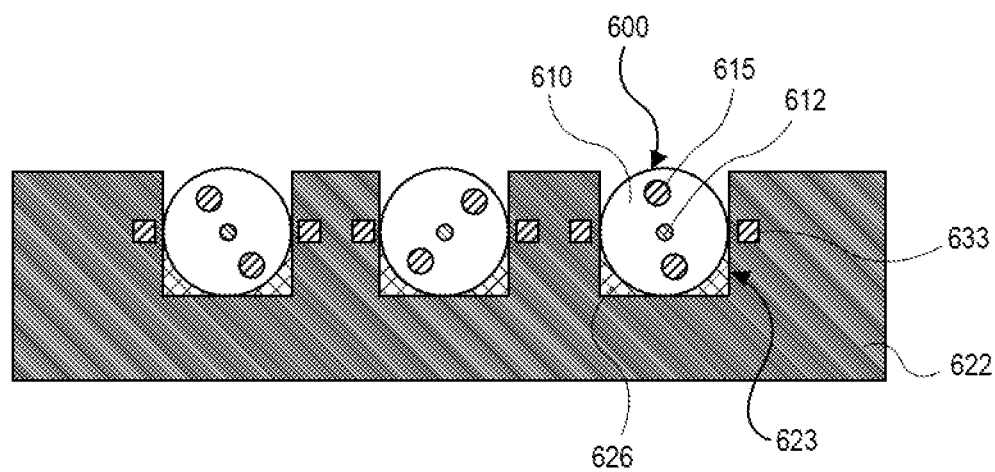
FIGS. 6A-6C are cross-sectional illustrations depicting a process for aligning PMFs in grooves by placing magnetic structures in the sidewall of the grooves, in accordance with an embodiment.
Figure 6B:
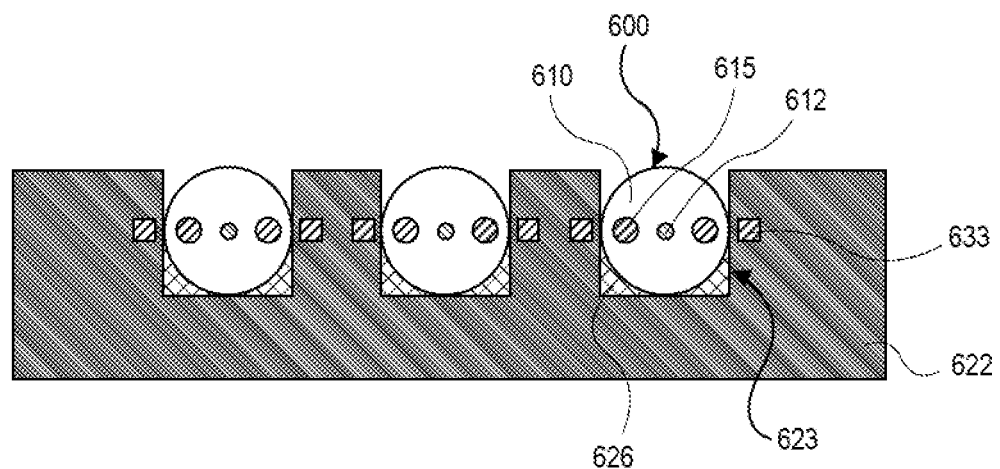
Figure 6C:
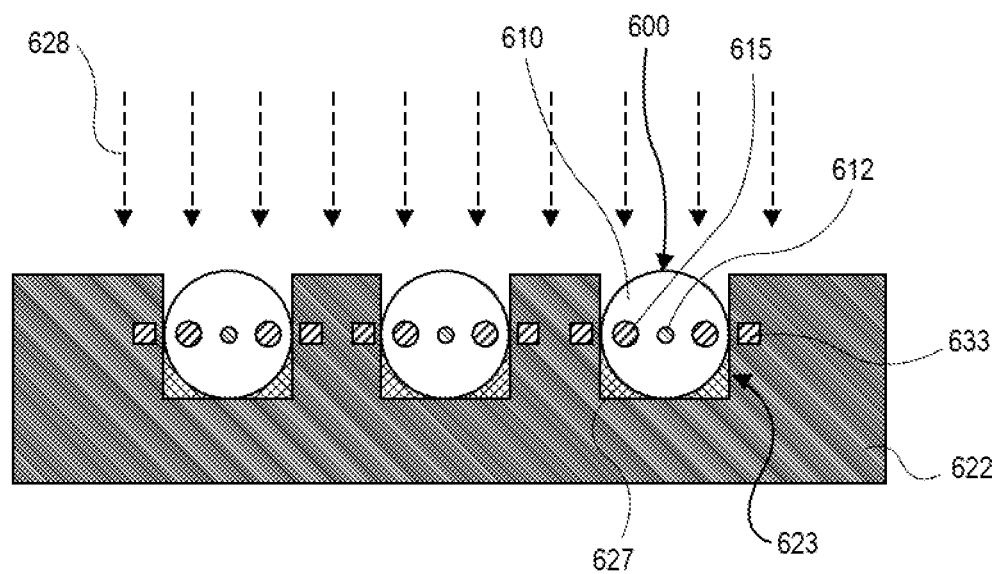

Referring now to FIGS. 6A-6C, a series of cross-sectional illustrations depicting a process for aligning PMFs 600 in grooves 623 is shown, in accordance with an additional embodiment. In the embodiment shown in FIGS. 6A-6C, the PMFs 600 are aligned with magnetic attraction in the grooves 623 of a PIC 622.

Referring now to FIG. 6A, the grooves 623 may be square grooves, though grooves with other shapes may also be used in some embodiments. Additionally, while described as a PIC 622, it is to be appreciated that similar alignment processes may be implemented with grooves on other structures (e.g., on a fiber array unit (FAU) or the like).

In an embodiment, the PMFs 600 may each comprise a core 612 and a cladding 610 around the core 612. Rods 615 may be provided on opposite sides of the core 612 within the cladding 610. In an embodiment, the rods 615 comprise a magnetic material. In a particular embodiment, the PMFs 600 may be substantially similar to the PMFs 200 described above with respect to FIG. 2A. In an embodiment, the PMFs 600 may be over a curable adhesive 626 that is in the bottom of the grooves 623. In an embodiment, metallic guides 633 may be provided in the sidewalls of the grooves 623.

As shown in FIG. 6A, the PMFs 600 have non-uniform rotations within the grooves 623. That is, the PMFs 600 may be placed in the grooves 623 without any particular concern as to their orientation. Such an embodiment may occur when the PMFs 600 are not bundled (as is shown in FIG. 4). Instead, the PMFs 600 may be considered loose fibers. Additionally, the PMFs 600 may be far enough apart from each other so that the magnetic rods 615 do not initiate a self-aligning action, similar to what is shown in FIG. 2B.

Referring now to FIG. 6B, a cross-sectional illustration of the PIC 622 after the PMFs 600 are aligned is shown, in accordance with an embodiment. In an embodiment, the PMFs 600 may self-align by having the magnetic rods 615 attract to the metallic guides 633. In some embodiments vibration or some mechanical stress may be used to accelerate the self-aligning process. As shown, the adhesive 626 is uncured at this point in order to allow for the PMFs 600 to rotate into the proper orientation.

Referring now to FIG. 6C, a cross-sectional illustration of the PIC 622 after the adhesive 626 is cured to form cured adhesive 627 is shown, in accordance with an embodiment. In an embodiment, the cured adhesive 627 may be cured with a UV exposure 628, a temperature cure, or the like. In some embodiments, additional adhesive may be provided over a top half of the PMFs 600. A glass top similar to the glass layer 532 in FIG. 5C may also be included in some embodiments.

Figure 7A:
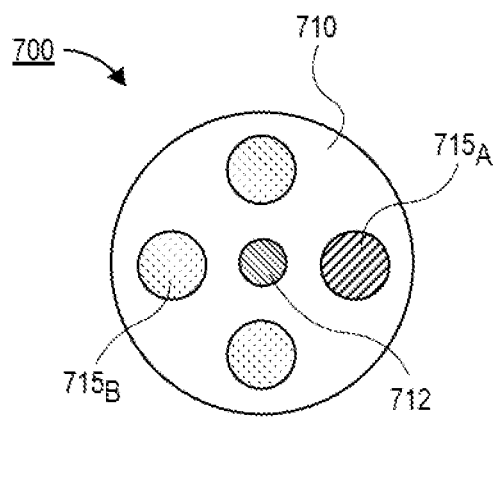
FIG. 7A is a cross-sectional illustration of a PMF with four rods, where one of the rods is magnetic, in accordance with an embodiment.

Referring now to FIG. 7A, a cross-sectional illustration of a PMF 700 is shown in accordance with an additional embodiment. The PMF 700 may comprise a core 712 that is surrounded by a cladding 710. The core 712 may be a glass material or the like, and the cladding may be a plastic material. In an embodiment, a plurality of rods 715 may be provided around the core 712 within the cladding 710. In a particular embodiment, four rods 715 are shown. The rods 715 may be evenly distributed around a perimeter of the core 712. For example, each rod 715 has a 90° separation from the next rod 715. In an embodiment, a first rod $715_A$ has a magnetic material. For example, the first rod $715_A$ may comprise ferrite nanoparticles, or any other magnetic material. The second rods $715_B$ may be a material that is magnetically attracted to the first rod $715_A$. For example, the second rods $715_B$ may comprise iron, nickel, cobalt, or the like. In some embodiments, only the second rod $715_B$ on the opposite side of the core 712 from the first rod $715_A$ may comprise a metallic. The other second rods $715_B$ (i.e., the topmost rod $715_B$ in FIG. 7A and the bottommost rod $715_B$ in FIG. 7A) may comprise non-metallic materials, such as boron trioxide ($B_2O_3$).

Figure 7B:
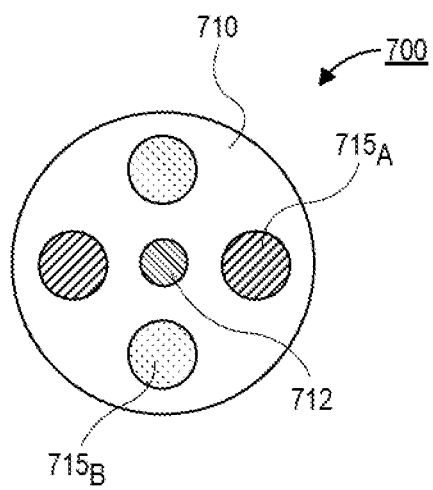
FIG. 7B is a cross-sectional illustration of a PMF with four rods, where two of the rods are magnetic, in accordance with an embodiment.

Referring now to FIG. 7B, a cross-sectional illustration of a PMF 700 is shown, in accordance with an additional embodiment. In an embodiment, the PMF 700 in FIG. 7B may be substantially similar to the PMF 700 in FIG. 7A, with the exception of the inclusion of an additional first rod $715_A$. The additional first rod $715_A$ may be on the opposite side of the core 712 from the other first rod $715_A$. Additionally, the second rods $715_B$ in FIG. 7B may not be metallic rods. As such, the rods $715_B$ may not be attracted to the first rods $715_A$. Accordingly The PMF 700 may self-align with other PMFs 700 by the magnetic first rods $715_A$ being attracted to each other.

Figure 8:
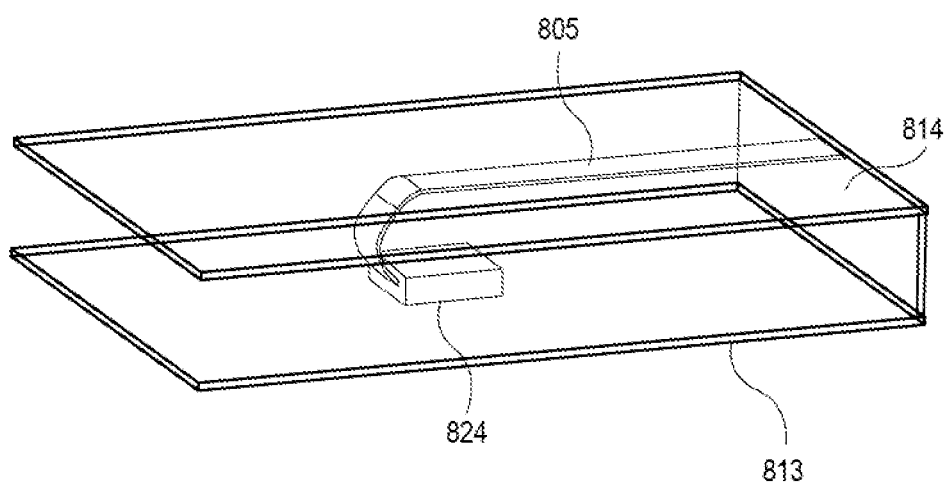
FIG. 8 is a perspective view illustration of an FAU coupled to a metal chassis with the PMF ribbon magnetically coupled to the chassis, in accordance with an embodiment.

Referring now to FIG. 8, a perspective view illustration of metal chassis body is shown, in accordance with an embodiment. In an embodiment, the chassis may be used in a server environment or the like. As such, cable management can be a difficult parameter to control. Embodiments disclosed herein provide improved fiber management because the fiber ribbon 805 is magnetic and can magnetically attach to the metal plate 814. In the illustrated embodiment, an FAU 824 is provided on a bottom plate 813. A fiber ribbon 805 may extend out from the FAU 824 and attach to the top plate 814 with a magnetic attachment. In an embodiment, the fiber ribbon 805 may be substantially similar to any of the fiber arrays and/or fiber ribbons described above. For example, self-aligned PMFs may be bundled together and surrounded by a molding material in order to form the fiber ribbon 805.

Figure 9:
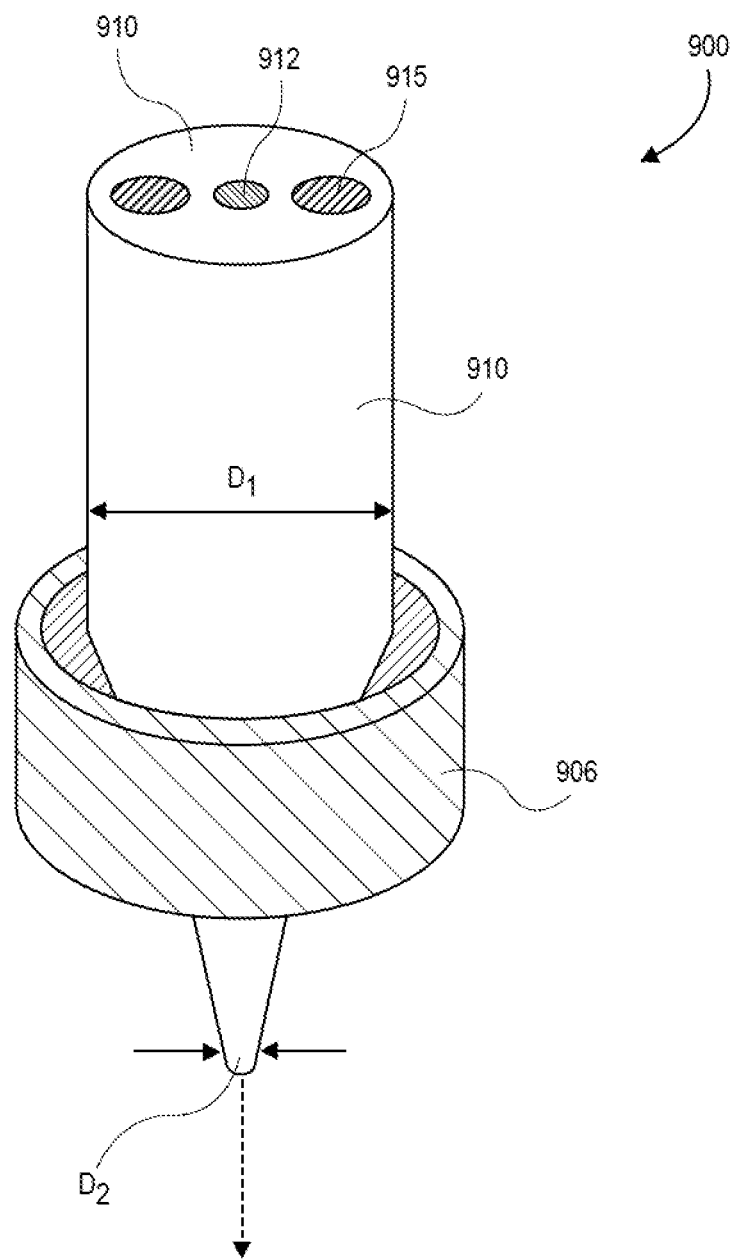
FIG. 9 is a perspective view illustration of a process for forming a PMF, in accordance with an embodiment.

Referring now to FIG. 9, a perspective view illustration of a device for forming PMFs 900 is shown, in accordance with an embodiment. In an embodiment, a PMF 900 starts with a wide diameter cladding 910. The core 912 and the rods 915 are provided through the cladding 910. The cladding 910 may have a first diameter $D_1$ above a heater 906. The PMF 900 is pulled through the heater 906 which allows for the fiber with a second diameter $D_2$ to be drawn (as indicated by the dashed arrow). In a particular embodiment, the temperature of the heater 906 may be below the melting point of the magnetic material in the rods 915. For example, the melting temperature of the ferrite particles in the rods 915 may be approximately 300° C. As such, the cladding 910 should be a material that has a melting temperature lower than 300° C. in order to allow for the cladding 910 to be drawn without damaging the magnetic properties of the rods 915.

Figure 10A:
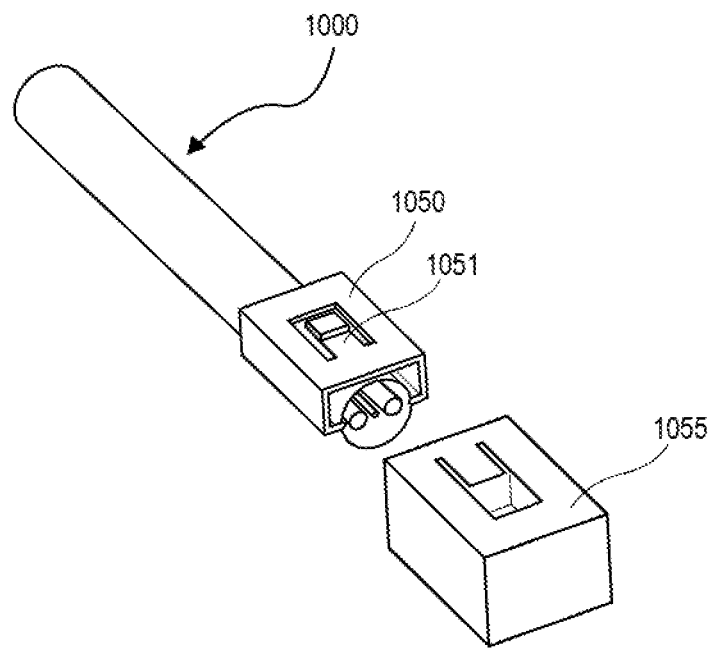
FIGS. 10A and 10B are perspective view illustration of a PMF with a housing for interfacing with a connector, in accordance with an embodiment.
Figure 10B:
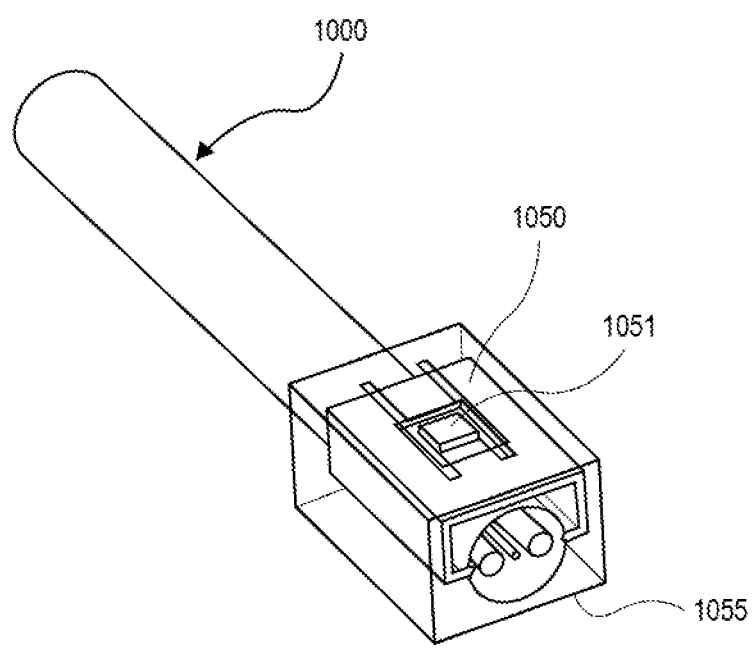

Referring now to FIGS. 10A and 10B, perspective view illustrations of a PMF 1000 is shown, in accordance with an additional embodiment. Instead of relying on magnetic features to align the PMF 1000, embodiments shown in FIGS. 10A and 10B use a mechanical housing 1050 that is secured to the PMF 1000 and attached to a connector 1055.

Referring now to FIG. 10A, a perspective view illustration of PMF 1000 is shown, in accordance with an embodiment. In an embodiment, a housing 1050 is attached to an end of the PMF 1000. The housing 1050 is attached to the PMF 1000 so that the PMF 1000 has a known orientation. For example, the core and rods of the PMF 1000 are aligned from left to right. Since the orientation is locked by the housing 1050, a macro sized mechanical device is used to set the alignment of the PMF 1000 with respect to a connector 1055. As shown, the connector 1055 may include a cutout to receive a latch 1051 on the housing.

Referring now to FIG. 10B, a perspective view illustration of the PMF 1000 after it is inserted into the connector 1055 is shown, in accordance with an embodiment. In an embodiment, the connector wraps around the housing 1050 and the PMF 1000. The latch 1051 extends up into the cutout in the connector 1055 in order to secure the housing 1050 in the connector 1055. In an embodiment, the latch 1051 may be pressed down in order to release the housing 1050 from the connector 1055.

Figure 11A:
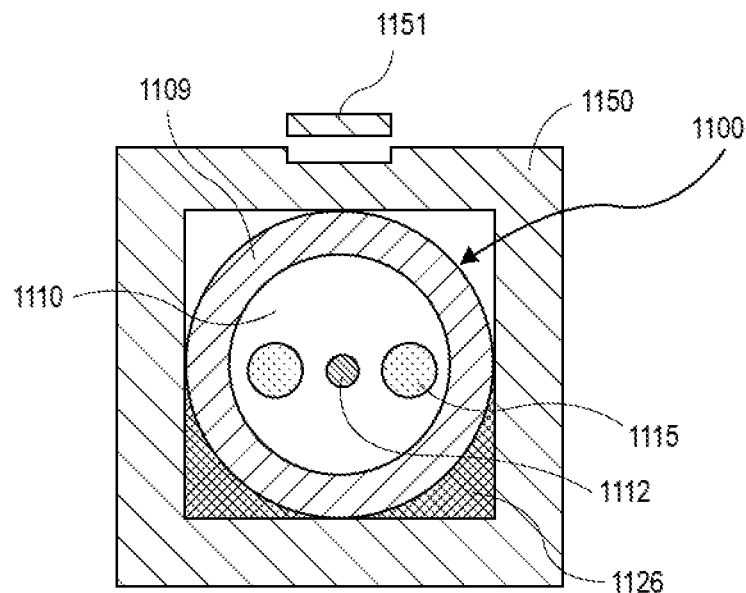
FIG. 11A is a cross-sectional illustration of a PMF within a housing, in accordance with an embodiment.
Figure 11B:
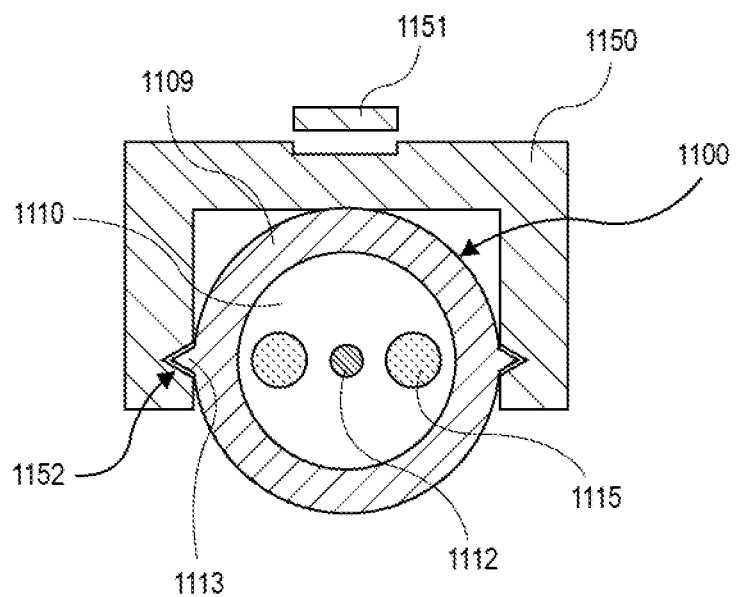
FIG. 11B is a cross-sectional illustration of a PMF with a housing partially around the PMF, and where protrusions on the PMF interface with grooves on the housing, in accordance with an embodiment.
Figure 11C:
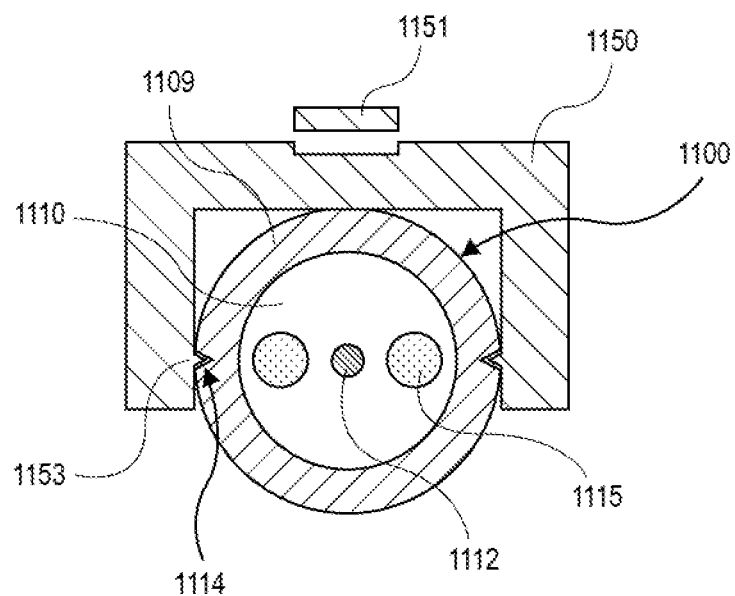
FIG. 11C is a cross-sectional illustration of a PMF with a housing partially around the PMF, and where protrusions on the housing interface with grooves on the PMF, in accordance with an embodiment.

Referring now to FIGS. 11A-11C a series of cross-sectional illustrations of ends of the PMF 1100 surrounded by a housing 1150 is shown, in accordance with various embodiments. The different FIGS. 11A-11C provide alternative implementations of how the housing 1150 can be coupled to the PMF 1100.

Referring now to FIG. 11A, a cross-sectional illustration of a PMF 1100 in a housing 1150 is shown, in accordance with an embodiment. In an embodiment, the PMF 1100 comprises a first cladding 1110 that surrounds a core 1112 and rods 1115. In an embodiment, a second cladding 1109 may be provided around the first cladding 1110. The PMF 1100 may be inserted into the housing 1150. The PMF 1100 may be secured to the housing with an adhesive 1126. After the PMF 1100 is aligned with the housing 1150, the adhesive 1126 may be cured in order to lock the orientation of the PMF 1100.

In an embodiment, the housing 1150 completely surrounds a perimeter of the PMF 1100. For example, the housing 1150 may be a frame shaped structure, and the PMF 1100 fits into the interior of the frame of the housing 1150. In the illustrated embodiment, the width and the height of the opening in the housing 1150 may be substantially equal to the outer diameter of the second cladding 1109 of the PMF 1100. That is, the second cladding 1109 may contact interior surfaces of the frame of the housing 1150. However, in other embodiments the diameter of the second cladding 1109 may be smaller than the width and the height of the opening in the housing 1150.

In an embodiment, the housing 1150 may be configured to interface with a connector (not shown). The housing 1150 may include features that secure the housing to the connector. For example, the housing 1150 may comprise a latch 1151. The latch 1151 appears floating in the cross-sectional illustration shown in FIG. 11A. However, it is to be appreciated that the latch 1151 is connected to the remainder of the housing 1150 outside of the plane illustrated in FIG. 11A.

Referring now to FIG. 11B, a cross-sectional illustration of a PMF 1100 that is secured by a housing 1150 is shown, in accordance with an additional embodiment. In an embodiment, the housing 1150 partially surrounds a perimeter of the PMF 1100. For example, the housing 1150 surrounds the top half of the PMF 1100 in FIG. 11B. In an embodiment, the PMF 1100 is secured to the housing 1150 with a protrusion and groove architecture. For example, the PMF 1100 may include protrusions 1113. The protrusions 1113 may be adjacent to the rods 1115. That is, the rods 1115, the core 1112, and the protrusions 1113 may be aligned in a line. In an embodiment, the housing 1150 may include grooves 1152. The grooves 1152 may be shaped to accommodate the protrusions 1113. Inserting the protrusions 1113 into the grooves 1152 properly aligns the PMF 1100 with the housing 1150.

Referring now to FIG. 11C, a cross-sectional illustration of a PMF 1100 that is secured by a housing 1150 is shown, in accordance with an additional embodiment. In an embodiment, the PMF 1100 and the housing 1150 shown in FIG. 11C are substantially similar to the PMF 1100 and the housing 1150 shown in FIG. 11B, with the exception of the interface between the PMF 1100 and the housing 1150. Instead of having protrusions extending out from the second cladding 1109, protrusions 1153 are formed as part of the housing 1150. The protrusions 1153 interface with grooves 1114 formed into the second cladding 1109. Similar to the embodiment shown in FIG. 11B, the protrusion 1153 and the groove 1114 architecture allows for the PMF 1100 to be aligned with the housing 1150.

Figure 12A:
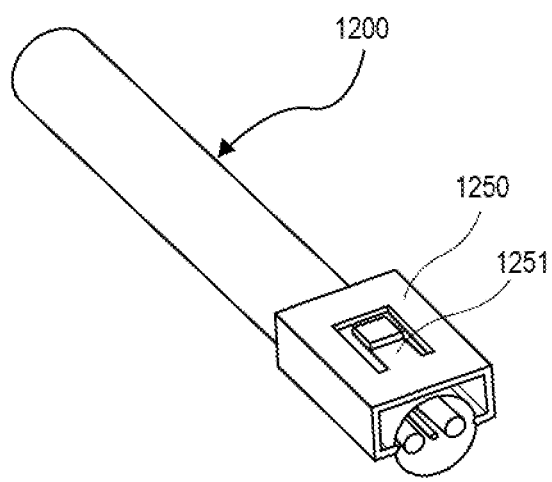
FIG. 12A is a perspective view illustration of a PMF with a housing, in accordance with an embodiment.

Referring now to FIG. 12A, a perspective view illustration of a PMF 1200 and a housing 1250 is shown, in accordance with an embodiment. In an embodiment, the housing 1250 is provided at an end of the PMF 1200. In the embodiment illustrated in FIG. 12A, the housing 1250 is similar to the housings shown in FIG. 11B or 11C. That is, the housing 1250 partially surrounds a perimeter of the PMF 1200. For example, the housing 1250 wraps around a top half of the PMF 1200, and is secured to the sides of the PMF 1200 (e.g., with a protrusion and groove architecture). In an embodiment, the housing 1250 may include a latch 1250 to affix the housing 1250 to a connector (not shown).

Figure 12B:
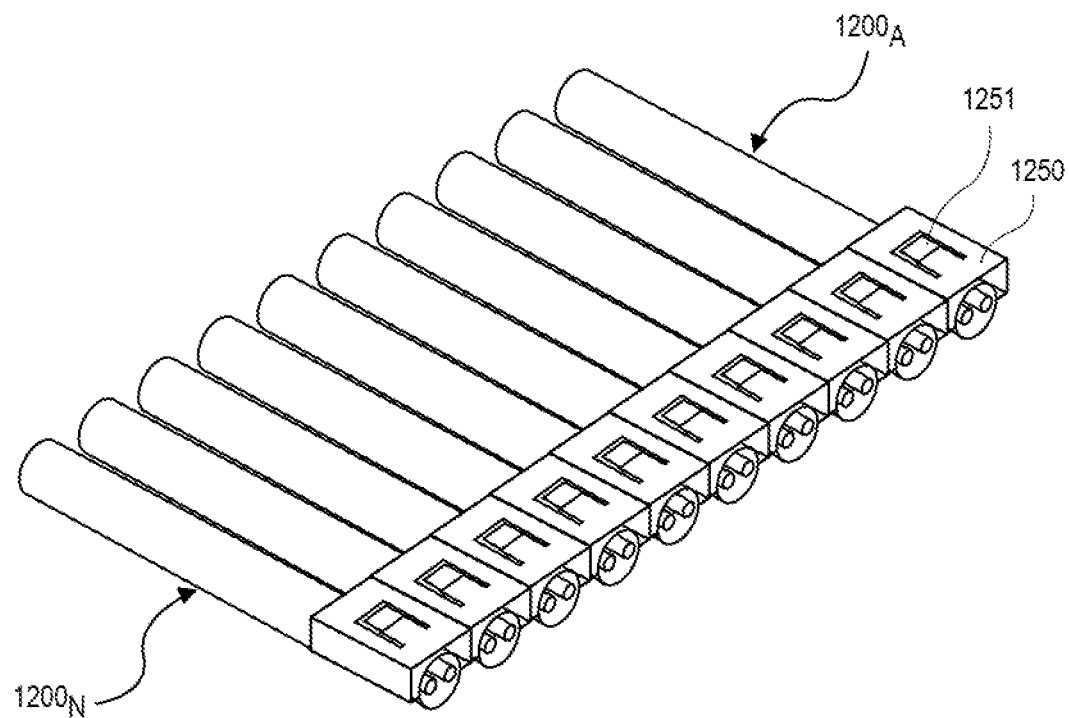
FIG. 12B is a perspective view illustration of a plurality of PMFs and housings in an array, in accordance with an embodiment.

Referring now to FIG. 12B, a perspective view illustration of an array of PMFs 1200$_A$-1200$_N$ is shown, in accordance with an embodiment. In the illustrated embodiment, ten PMFs 1200 are shown, but it is to be appreciated that any number of PMFs 1200 may be included in the array. The PMFs 1200 may be adjacent to each other in order to form a line of PMFs 1200. In an embodiment, the rods of the PMFs 1200 may all be aligned with each other. In an embodiment, the PMFs 1200 may each be surrounded by a housing 1250. The housings 1250 may be any housing architecture described herein. In the particular embodiment, shown in FIG. 12B, the housings 1250 partially wrap around the PMFs 1200 and are attached with a groove and protrusion architecture. In an embodiment, the housings 1250 may be discrete elements. In other embodiments, the housings 1250 may be coupled to each other. For example, the housings 1250 may share sidewalls.

Figure 13A:
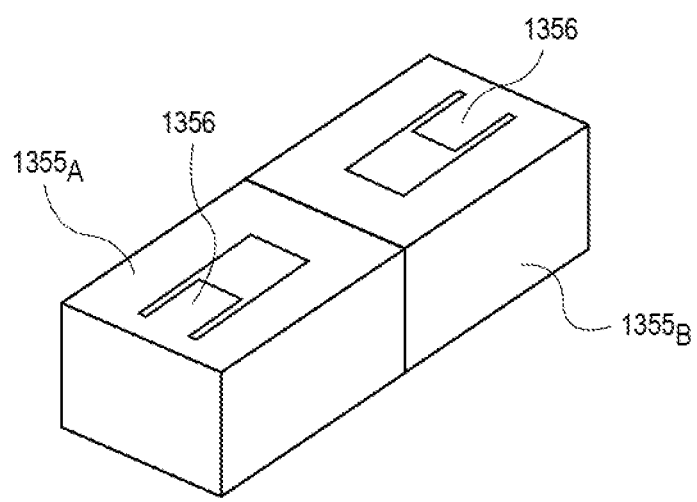
FIG. 13A is a perspective view illustration of a connector, in accordance with an embodiment.
Figure 13B:
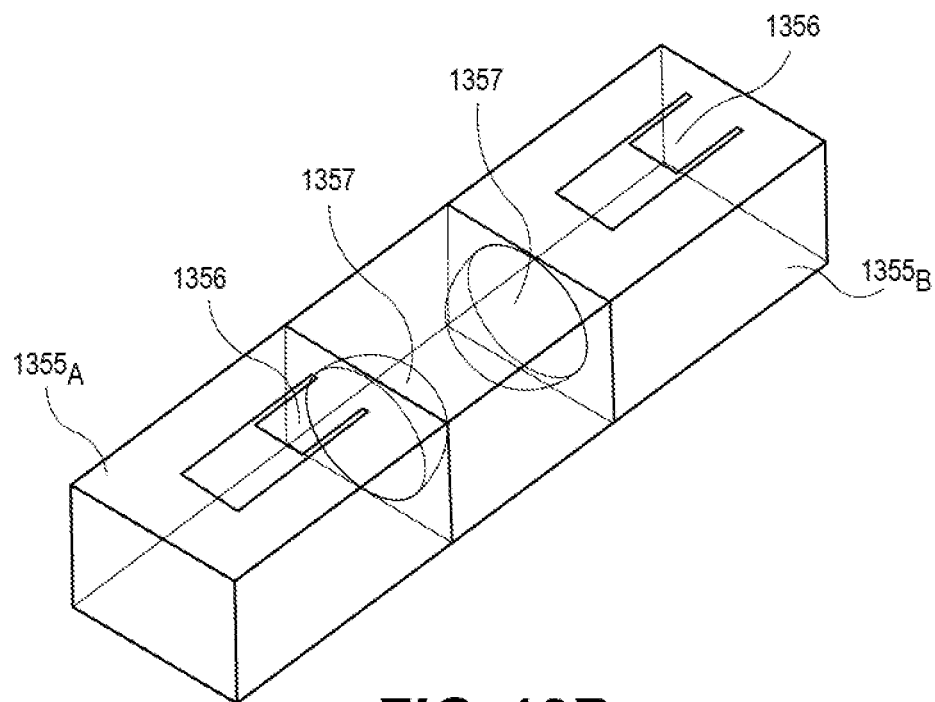
FIG. 13B is a perspective view illustration of a connector with lenses, in accordance with an embodiment.
Figure 13C:
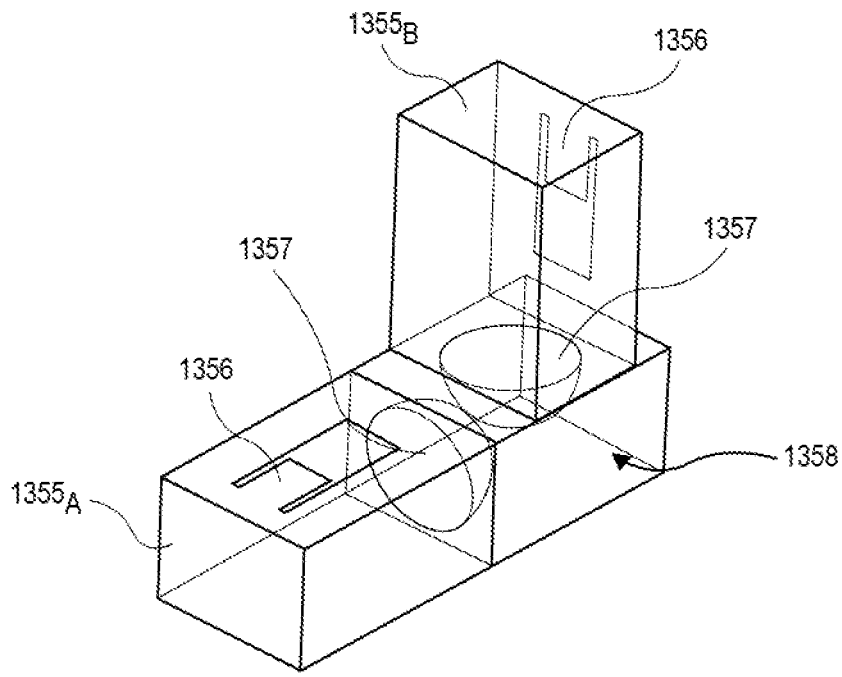
FIG. 13C is a perspective view illustration of an angled connector, in accordance with an embodiment.

Referring now to FIGS. 13A-13C, a series of perspective view illustrations of connectors 1355 are shown, in accordance with various embodiments. In FIG. 13A, a straight connector is shown. In FIG. 13B, a straight connector with lenses is shown. In FIG. 13C, an angled connector is shown.

Referring now to FIG. 13A, a perspective view illustration of a connector is shown, in accordance with an embodiment. In the illustrated embodiment, the connector comprises a first connector $1355_A$ and a second connector $1355_B$. The first connector $1355_A$ is coupled to the second connector $1355_B$ in order optically couple a first PMF to a second PMF (not shown). In an embodiment, each connector 1355 comprises a notch 1356 to secure latches of the PMFs. In the illustrated embodiment, the connectors $1355_A$ and $1355_B$ are linearly aligned. That is, there is no turn between the first connector $1355_A$ and the second connector $1355_B$.

Referring now to FIG. 13B, a perspective view illustration of a connector with lenses 1357 is shown, in accordance with an embodiment. In an embodiment, the connector in FIG. 13B may be substantially similar to the connector in FIG. 13A, with the addition of lenses 1357. In an embodiment, each of the connectors $1355_A$ and $1355_B$ may be terminated with a lens 1357. In an embodiment, the lenses 1357 provide improved optical coupling between PMFs connected to the connectors 1355.

Referring now to FIG. 13C, a perspective view illustration of a connector that is angled is shown, in accordance with an embodiment. In an embodiment, the first connector $1355_A$ and the second connector $1355_B$ are oriented 90° with respect to each other. As such, an optical signal may be turned without having to bend an optical fiber. In an embodiment, a first PMF in the first connector $1355_A$ is coupled to a second PMF in the second connector $1355_B$ with lenses 1357 and a mirror 1358. The mirror may be at a 45° angle to the connectors 1355 in order to allow for the 90° turn. In other embodiments, the mirror 1358 may be at different angles in order to provide a connector that has a turn of a different angle.

Figure 14A:
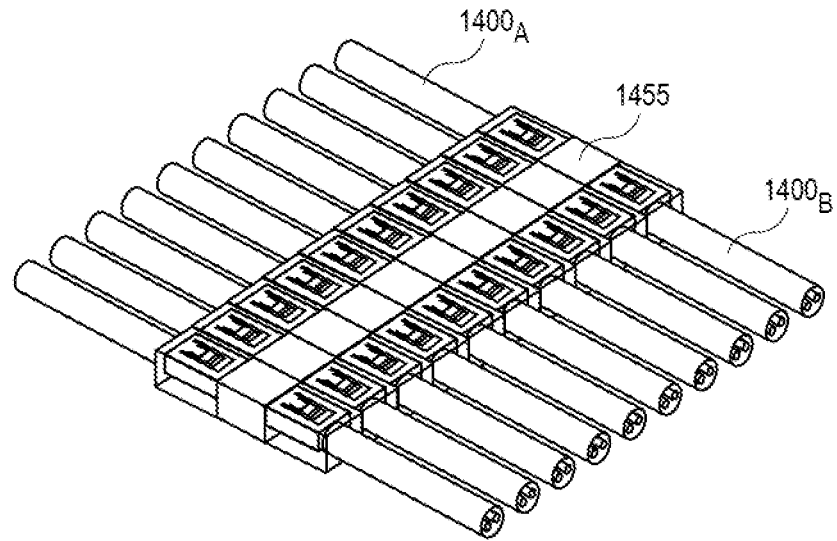
FIG. 14A is a perspective view illustration of an array of PMFs that are connected with straight connectors, in accordance with an embodiment.

Referring now to FIG. 14A, a perspective view illustration of a plurality of PMFs 1400 connected with a connector 1455 is shown, in accordance with an embodiment. In an embodiment, the connectors 1455 are linear connectors. That is, PMFs $1400_A$ on a first end of the connectors 1455 are linearly connected to PMFs $1400_B$ on a second end of the connectors 1455. In an embodiment, the connectors 1455 may be discrete from each other. In other embodiments, the connectors 1455 may be coupled to each other. While ten connectors 1455 are shown in FIG. 14A, it is to be appreciated that any number of connectors 1455 may be included in the array of PMFs $1400_A$ and $1400_B$. The connectors 1455 in FIG. 14A may be substantially similar to the connectors 1355 in FIG. 13A. However, in other embodiments, the connectors 1455 may have lenses similar to the connectors 1355 shown in FIG. 13B.

Figure 14B:
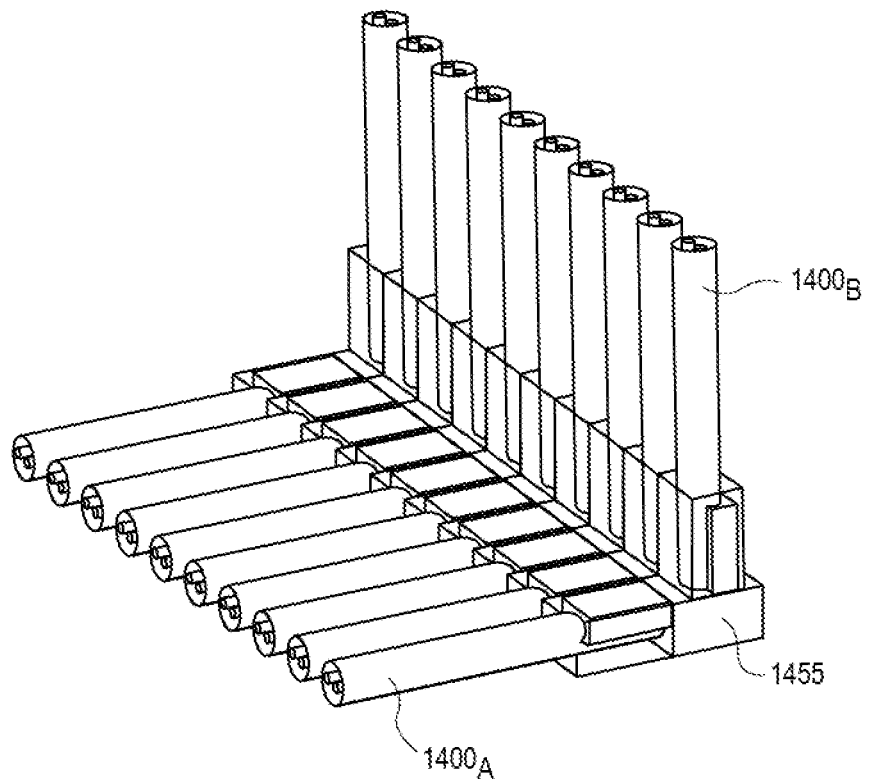
FIG. 14B is a perspective view illustration of an array of PMFs that are connected with angled connectors, in accordance with an embodiment.

Referring now to FIG. 14B, a perspective view illustration of a plurality of PMFs 1400 connected with angled connectors 1455 is shown, in accordance with an embodiment. In an embodiment, the angled connectors 1455 may have a 90° turn. Though, it is to be appreciated that other embodiments may include turns of different angles. The turn may be implemented with the use of a mirror at the corner of the connector 1455. In an embodiment, the angled connectors 1455 may be substantially similar to the connector 1355 in FIG. 13C. In FIG. 14B, ten pairs of PMFs $1400_A$ and $1400_B$ are shown. However, it is to be appreciated that any number of PMFs 1400 may be used in accordance with various embodiments. In an embodiment, the connectors 1455 may be discrete components. In other embodiments, the connectors 1455 may be coupled together.

Figure 15A:
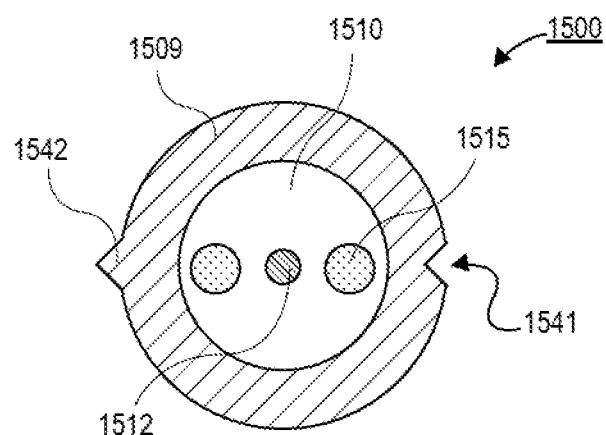
FIG. 15A is a cross-sectional illustration of a PMF with an alignment structure that comprises a protrusion and a groove, in accordance with an embodiment.
Figure 15B:
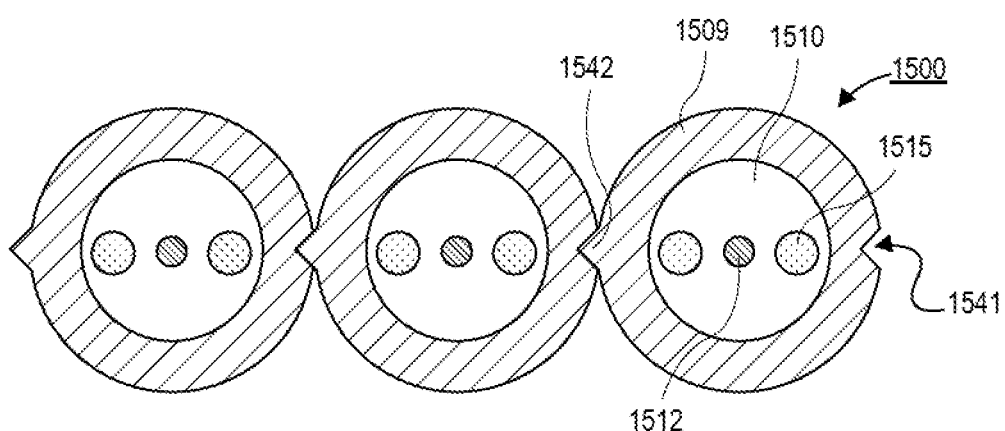
FIG. 15B is a cross-sectional illustration of a plurality of PMFs that are connected with an alignment structure, in accordance with an embodiment.
Figure 15C:
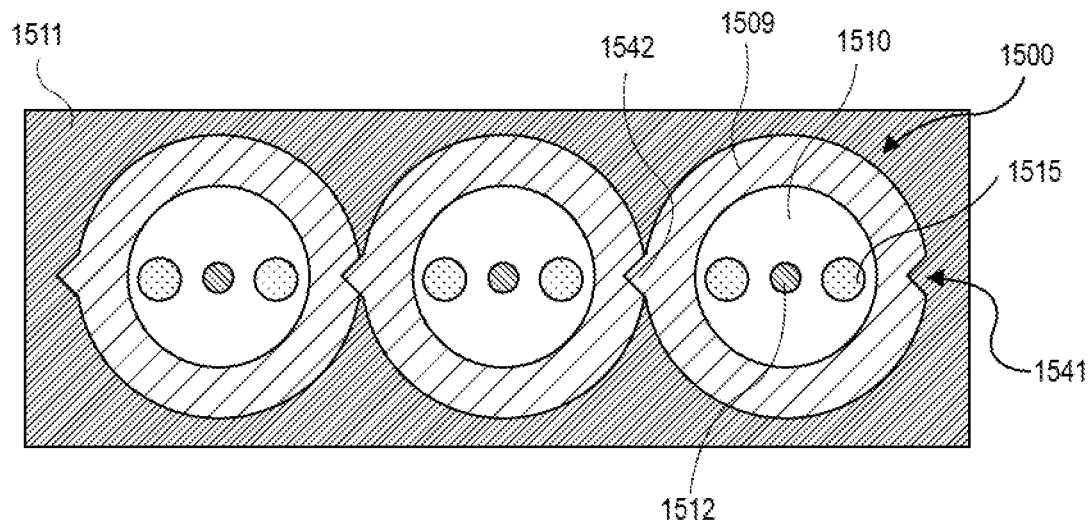
FIG. 15C is a cross-sectional illustration of a plurality of PMFs that are aligned with each other and surrounded by a mold layer, in accordance with an embodiment.

Referring now to FIGS. 15A-15C, a series of cross-sectional illustrations of PMFs 1500 and coupled PMFs 1500 is shown, in accordance with an embodiment. In an embodiment, the PMFs 1500 include alignment features that allow for mechanically coupling the PMFs 1500 so that they are properly aligned.

Referring now to FIG. 15A, a cross-sectional illustration of a PMF 1500 is shown, in accordance with an embodiment. In an embodiment, the PMF 1500 may comprise a core 1512 and a first cladding 1510 around the core 1512. A pair of rods 1515 may be provided on opposite sides of the core 1512. In an embodiment, the rods 1515 may comprise boron trioxide ($B_2O_3$) or another material useful as stress rods in PMFs 1500. That is, the rods 1515 may not be magnetic in some embodiments. However, it is to be appreciated that one or both of the rods 1515 may be magnetic, similar to embodiments described in greater detail above. In an embodiment, a second cladding 1509 may surround the first cladding 1510.

In an embodiment, an alignment feature may be provided in the second cladding 1509. The alignment feature may include a protrusion 1542 and a groove 1541. The protrusions 1542 and the groove 1541 may be on opposite sides of the second cladding 1509. In an embodiment, the protrusion 1542 and the groove 1541 may be aligned with the core 1512 and the rods 1515. That is, a single linear line can be drawn through the protrusion 1542, the rods 1515, the core 1512, and the groove 1541. The protrusion 1542 may be a shape that will couple with the groove 1541. For example, in FIG. 15A, the protrusion 1542 is triangular shaped and the groove 1541 is a matching triangle shape. However, it is to be appreciated that other shapes may be used for the protrusion 1542 and the groove 1541.

Referring now to FIG. 15B, a cross-sectional illustration of a plurality of PMFs 1500 that are coupled together is shown, in accordance with an embodiment. In an embodiment, the PMFs 1500 may be substantially similar to the PMFs 1500 shown in FIG. 15A is shown, in accordance with an embodiment. As shown, the alignment features (i.e., the protrusions 1542 and the grooves 1541) allow for the PMFs 1500 to be coupled to each other while maintaining alignment of the cores 1512 and the rods 1515. In the illustrated embodiment, three PMFs 1500 are shown, but it is to be appreciated that any number of PMFs 1500 may be coupled together in a similar fashion.

Referring now to FIG. 15C, a cross-sectional illustration of the plurality of PMFs 1500 that are embedded in a mold layer 1511 is shown, in accordance with an embodiment. In an embodiment, the mold layer 1511 may be any molding material in order to bundle the PMFs 1500 into a ribbon. The ribbon may have the mold layer 1511 along a length of the PMFs 1500 with a pigtail feature at the end of the PMFs 1500.

Figures 16A, 16B:
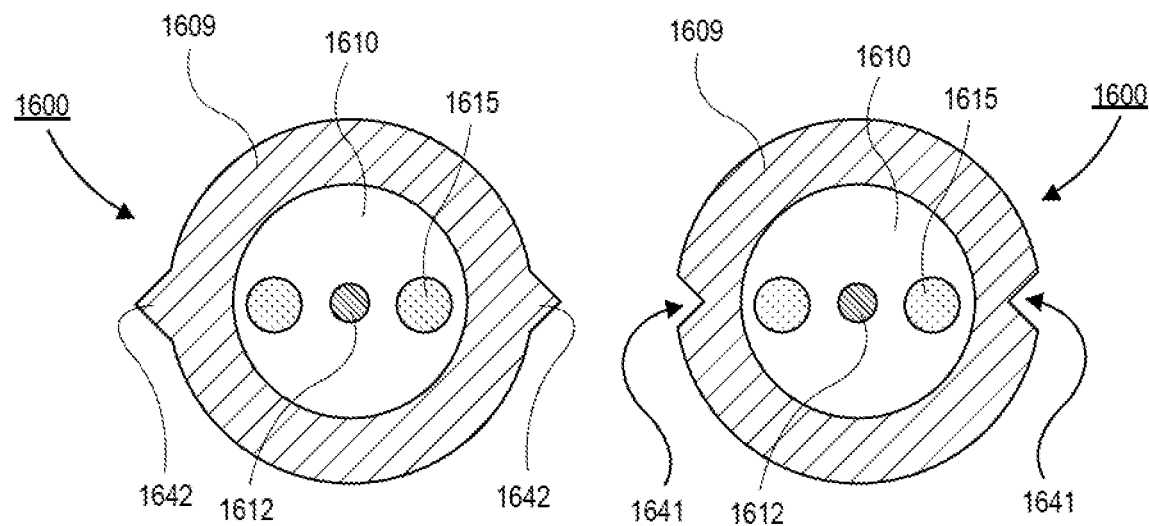
FIG. 16A is a cross-sectional illustration of a PMF with an alignment structure that comprises a pair of protrusions, in accordance with an embodiment.
FIG. 16B is a cross-sectional illustration of a PMF with an alignment structure that comprises a pair of grooves, in accordance with an embodiment.

Referring now to FIGS. 16A-16C, a series of cross-sectional illustrations of PMFs 1600 are shown, in accordance with various embodiments. In an embodiment, the PMFs 1600 may have one of two different alignment structures. The different alignment structures interface with each other. As such, a first type of PMF 1600 may alternate with a second type of PMF 1600.

Referring now to FIG. 16A, a cross-sectional illustration of a PMF 1600 is shown, in accordance with an embodiment. In an embodiment, the PMF 1600 may comprise a core 1612 and a first cladding 1610 around the core 1612. A pair of rods 1615 may be provided on opposite sides of the core 1612. In an embodiment, the rods 1615 may comprise boron trioxide ($B_2O_3$) or another material useful as stress rods in PMFs 1600. That is, the rods 1615 may not be magnetic in some embodiments. However, it is to be appreciated that one or both of the rods 1615 may be magnetic, similar to embodiments described in greater detail above. In an embodiment, a second cladding 1609 may surround the first cladding 1610.

In an embodiment, an alignment feature is provided in the second cladding 1609. The alignment feature may include a pair of protrusions 1642. In an embodiment, the protrusions 1642 may be on opposite sides of the second cladding 1609. Additionally, the protrusions 1642 may be aligned with the rods 1615 and the core 1612. The protrusions 1642 are shown as triangular protrusions, but it is to be appreciated that other protrusion shapes may also be used.

Referring now to FIG. 16B, a cross-sectional illustration of a second type of PMF 1600 is shown, in accordance with an embodiment. The PMF 1600 in FIG. 16B may be substantially similar to the PMF 1600 in FIG. 16A, with the exception of having a different alignment feature. Particularly, the alignment feature in FIG. 16B may be complimentary to the alignment feature in FIG. 16A. For example, grooves 1641 may be provided on opposite sides of the second cladding 1609. In the illustrated embodiment, the grooves 1641 are shown as being triangular in shape. However, it is to be appreciated that the grooves 1641 may be any shape that interfaces with the shape of the protrusions in the other PMF 1600.

Referring now to FIG. 16C, a cross-sectional illustration of an array of PMFs 1600 that are embedded in a mold layer 1611 is shown, in accordance with an embodiment. In an embodiment, the PMFs 1600 may include both types of PMFs 1600 shown in FIGS. 16A and 16B. For example, the center PMF 1600 is similar to the PMF 1600 in FIG. 16A, and the outer PMFs 1600 are similar to the PMF 1600 in FIG. 16B. That is, by alternating which type of PMF 1600 is used, an aligned chain of PMFs 1600 can be provided with any desired number of PMFs 1600.

Referring now to FIGS. 17A-17E, a series of cross-sectional illustrations depicting PMFs 1700 and arrays of PMFs 1700 is shown, in accordance with an embodiment. In the embodiment shown in FIGS. 17A-17E, pairs of PMFs 1700 are coupled together, and a plurality of pairs can be placed adjacent to each other to form an array.

Referring now to FIG. 17A, a cross-sectional illustration of a PMF 1700 is shown, in accordance with an embodiment. In an embodiment, the PMF 1700 may comprise a core 1712 and a first cladding 1710 around the core 1712. A pair of rods 1715 may be provided on opposite sides of the core 1712. In an embodiment, the rods 1715 may comprise boron trioxide ($B_2O_3$) or another material useful as stress rods in PMFs 1700. That is, the rods 1715 may not be magnetic in some embodiments. However, it is to be appreciated that one or both of the rods 1715 may be magnetic, similar to embodiments described in greater detail above. In an embodiment, a second cladding 1709 may surround the first cladding 1710.

In an embodiment, an alignment feature may be provided in the second cladding 1709. The alignment feature may include a protrusion 1742. In an embodiment, the protrusion 1742 may be aligned with the core 1712 and the rods 1715. That is, a single linear line can be drawn through the protrusion 1742, the rods 1515, and the core 1712. The protrusion 1742 may be a shape that will couple with a groove on a second PMF 1700. For example, in FIG. 17A, the protrusion 1742 is triangular shaped. However, it is to be appreciated that other shapes may be used for the protrusion 1742.

Referring now to FIG. 17B, a cross-sectional illustration of a second type of PMF 1700 is shown, in accordance with an additional embodiment. In an embodiment, the second PMF 1700 may be substantially similar to the first PMF 1700 described above in FIG. 17A, with the exception of the alignment feature. Instead of a protrusion 1742, the PMF 1700 includes a groove 1741. The groove 1741 may be a shape that interfaces with the protrusions 1742 of the first type of PMF 1700.

Figure 17C:
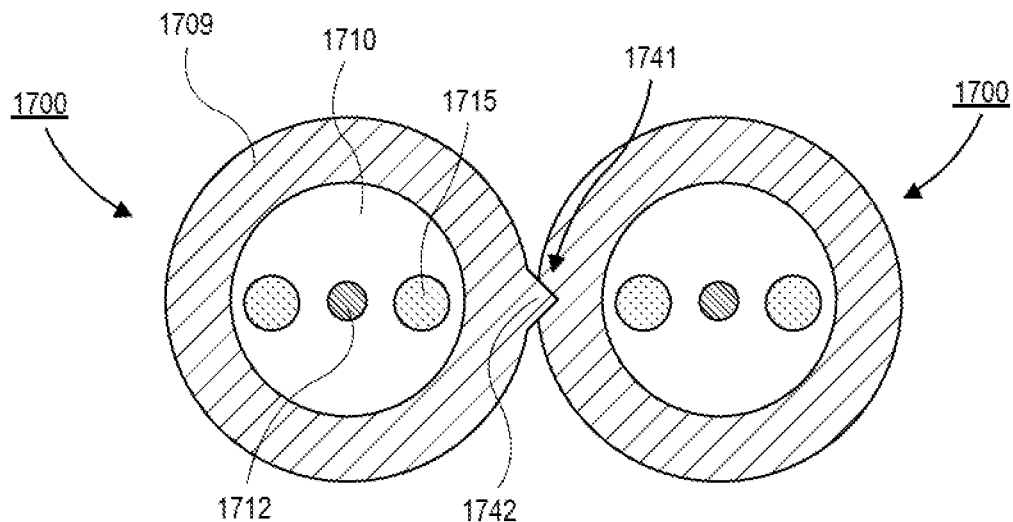
FIG. 17C is a cross-sectional illustration of a first PMF aligned with a second PMF, in accordance with an embodiment.

Referring now to FIG. 17C, a cross-sectional illustration of a pair of PMFs 1700 that are coupled together is shown, in accordance with an embodiment. As shown, the PMF 1700 on the left has a protrusion 1742, and the PMF 1700 on the right side has a groove 1741. The protrusion 1742 fits into the groove 1741 to couple the two PMFs 1700 together with proper alignment. That is, the rods 1715 in both PMFs 1700 are aligned with each other in a straight line.

Figure 17D:
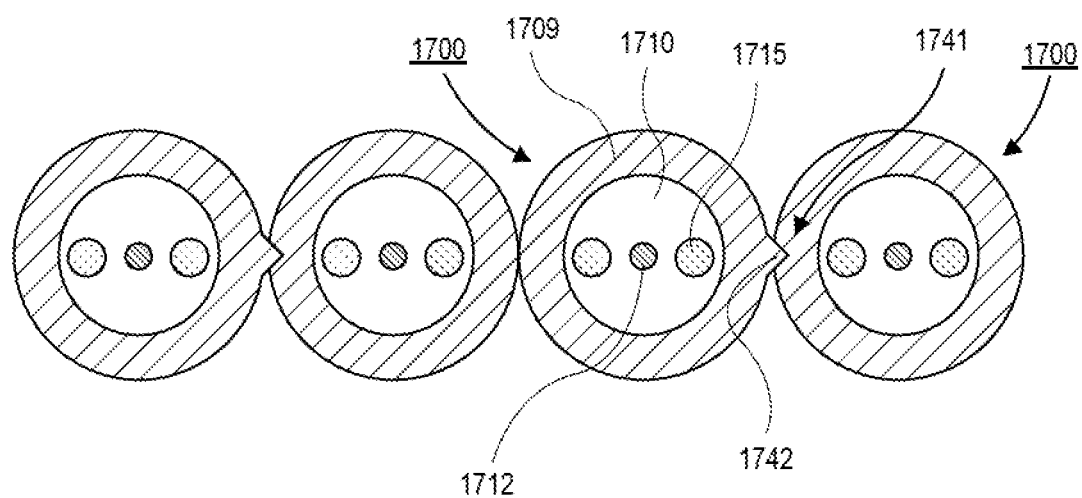
FIG. 17D is a cross-sectional illustration of a plurality of PMFs coupled to each other with alignment features, in accordance with an embodiment.

Referring now to FIG. 17D, a cross-sectional illustration of a plurality of PMFs 1700 are aligned together in an array is shown, in accordance with an embodiment. The plurality of PMFs 1700 includes two pairs of coupled PMFs 1700. That is, the coupled pairs may be aligned next to other coupled pairs to form an array.

Figure 17E:
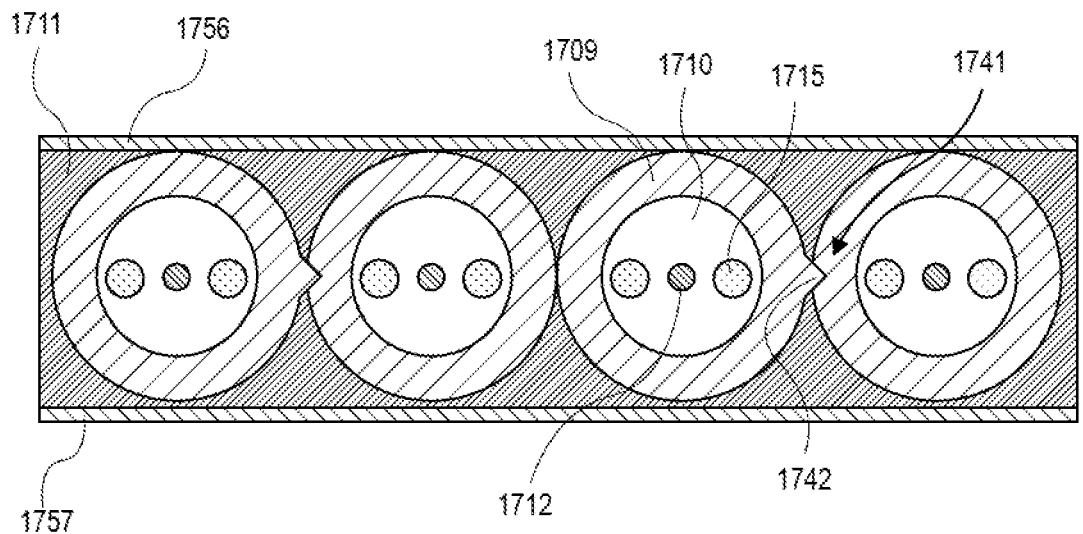
FIG. 17E is a cross-sectional illustration of a plurality of PMFs that are aligned with each other and surrounded by a mold layer, in accordance with an embodiment.

Referring now to FIG. 17E, a cross-sectional illustration of the array of PMFs 1700 after a mold layer 1711 is applied around the PMFs 1700 is shown, in accordance with an embodiment. In an embodiment, the mold layer 1711 may be pressed between plates 1756 and 1757. The plates 1756 and 1757 may be glass or any other rigid structure. In some embodiments, the plates 1756 and 1757 may be removed after the mold layer 1711 is cured.

Figure 18A:
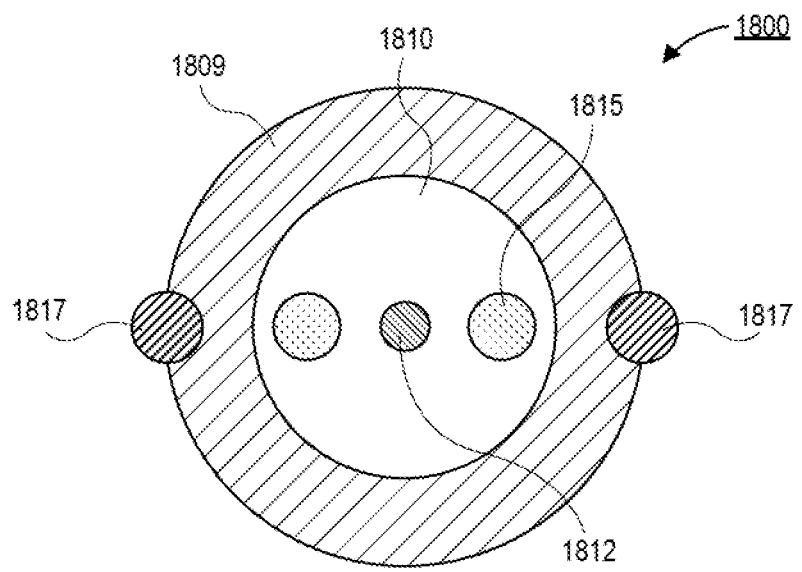
FIG. 18A is a cross-sectional illustration of a PMF with a pair of marking rods partially embedded in an outer cladding, in accordance with an embodiment.
Figure 18B:
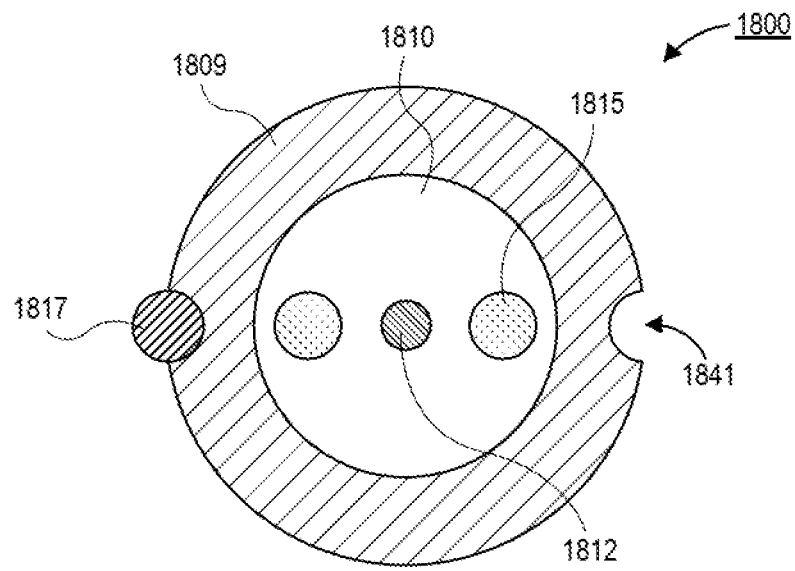
FIG. 18B is a cross-sectional illustration of a PMF with a marking rod and a groove, in accordance with an embodiment.
Figure 18C:
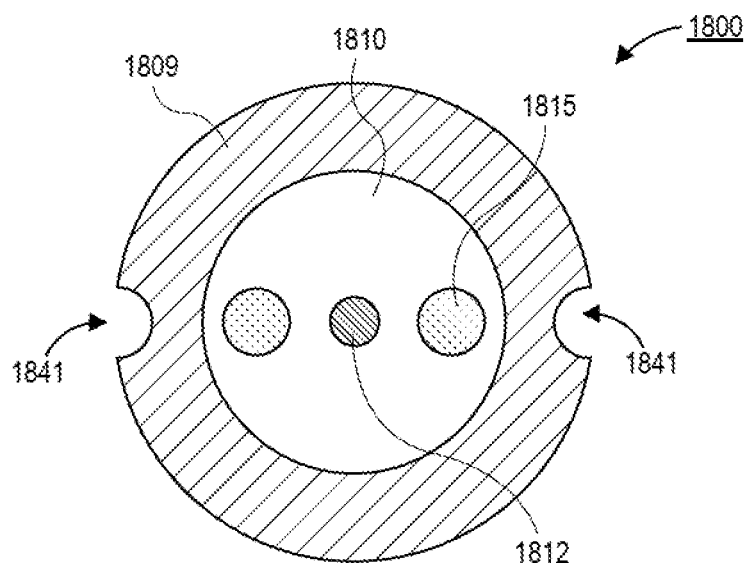
FIG. 18C is a cross-sectional illustration of a PMF with a pair of grooves, in accordance with an embodiment.

Referring now to FIGS. 18A-18C, a series of cross-sectional illustrations of PMFs 1800 is shown, in accordance with an embodiment. The PMFs 1800 depict the formation of various alignment structures that can be used to align PMFs 1800 so the rods and cores of multiple PMFs 1800 remain in alignment.

Referring now to FIG. 18A, a cross-sectional illustration of a PMF 1800 is shown, in accordance with an embodiment. In an embodiment, the PMF 1800 may comprise a core 1812 with a first cladding 1810. A pair of rods 1815 are on opposite sides of the core 1812 within the first cladding 1810. In an embodiment, a second cladding 1809 surrounds the first cladding 1810. Marking rods 1817 are provided in the second cladding 1809 on opposite sides of the core 1812. The marking rods 1817 may be partially embedded in the second cladding 1809 so that a portion of the marking rods 1817 become protrusions. In an embodiment, the marking rods 1817 may be a material that is different than the second cladding 1809. In some embodiments, the marking rods 1817 comprise the same material as the rods 1815. The marking rods 1817 may also have a similar diameter as the rods 1815.

Referring now to FIG. 18B, a cross-sectional illustration of a PMF 1800 is shown, in accordance with an embodiment. The PMF 1800 in FIG. 18B is substantially similar to the PMF 1800 in FIG. 18A, with the exception of one of the marking rods 1817 being removed. The removal of the marking rod 1817 on the right side of the PMF 1800 results in the formation of a groove 1841.

Referring now to FIG. 18C, a cross-sectional illustration of a PMF 1800 is shown, in accordance with an additional embodiment. The PMF 1800 in FIG. 18C is substantially similar to the PMF 1800 in FIG. 18B, with the exception of the second marking rod 1817 being removed. As such, the PMF 1800 includes a pair of grooves 1841.

Figure 19A:
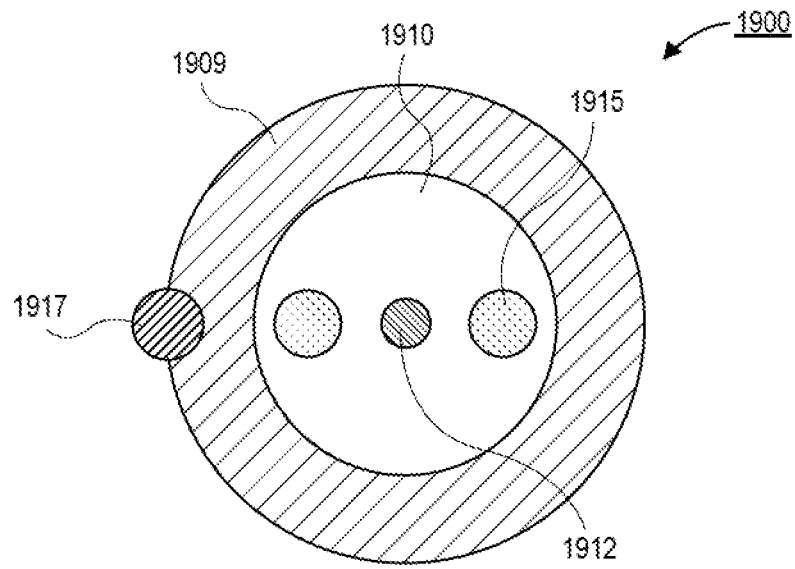
FIG. 19A is a cross-sectional illustration of a PMF with a marking rod partially embedded in an outer cladding, in accordance with an embodiment.
Figure 19B:
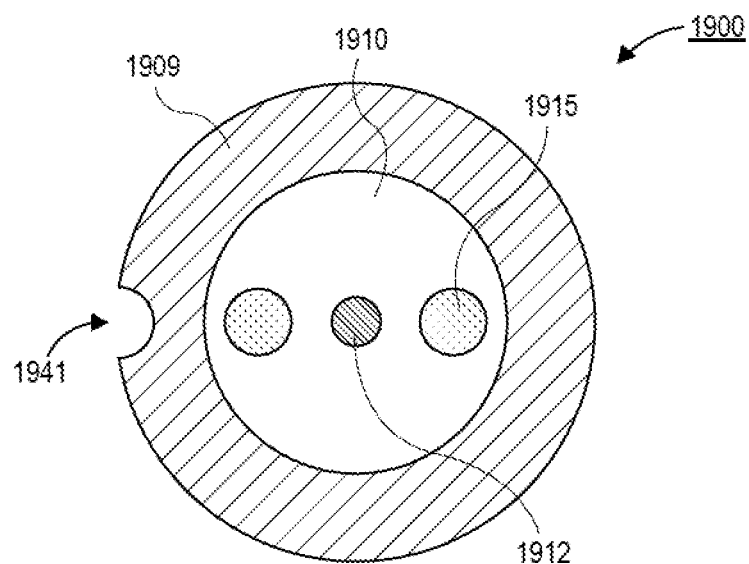
FIG. 19B is a cross-sectional illustration of a PMF with a groove in an outer cladding, in accordance with an embodiment.

Referring now to FIGS. 19A and 19B, a pair of cross-sectional illustrations depicting PMFs 1900 is shown, in accordance with an embodiment. In the embodiments shown in FIGS. 19A and 19B, a single alignment feature is provided in the PMFs 1900.

Referring now to FIG. 19A, a cross-sectional illustration of a PMF 1900 is shown, in accordance with an embodiment. In an embodiment, the PMF 1900 may comprise a core 1912 with a first cladding 1910. A pair of rods 1915 are on opposite sides of the core 1912 within the first cladding 1910. In an embodiment, a second cladding 1909 surrounds the first cladding 1910. A marking rod 1917 is provided in the second cladding 1909 on one side of the core 1912. The marking rod 1917 may be partially embedded in the second cladding 1909 so that a portion of the marking rod 1917 becomes a protrusion. In an embodiment, the marking rod 1917 may be a material that is different than the second cladding 1909. In some embodiments, the marking rod 1917 comprises the same material as the rods 1915. The marking rod 1917 may also have a similar diameter as the rods 1915.

Referring now to FIG. 19B, a cross-sectional illustration of a PMF 1900 is shown, in accordance with an additional embodiment. The PMF 1900 in FIG. 19B may be substantially similar to the PMF 1900 in FIG. 19A, with the exception of the marking rod 1917 being removed. The removal of the marking rod 1917 results in the formation of a groove 1941. The groove 1941 may be sized to receive a protrusion, such as the exposed portion of the marking rod 1917 in FIG. 19A.

Figure 20:
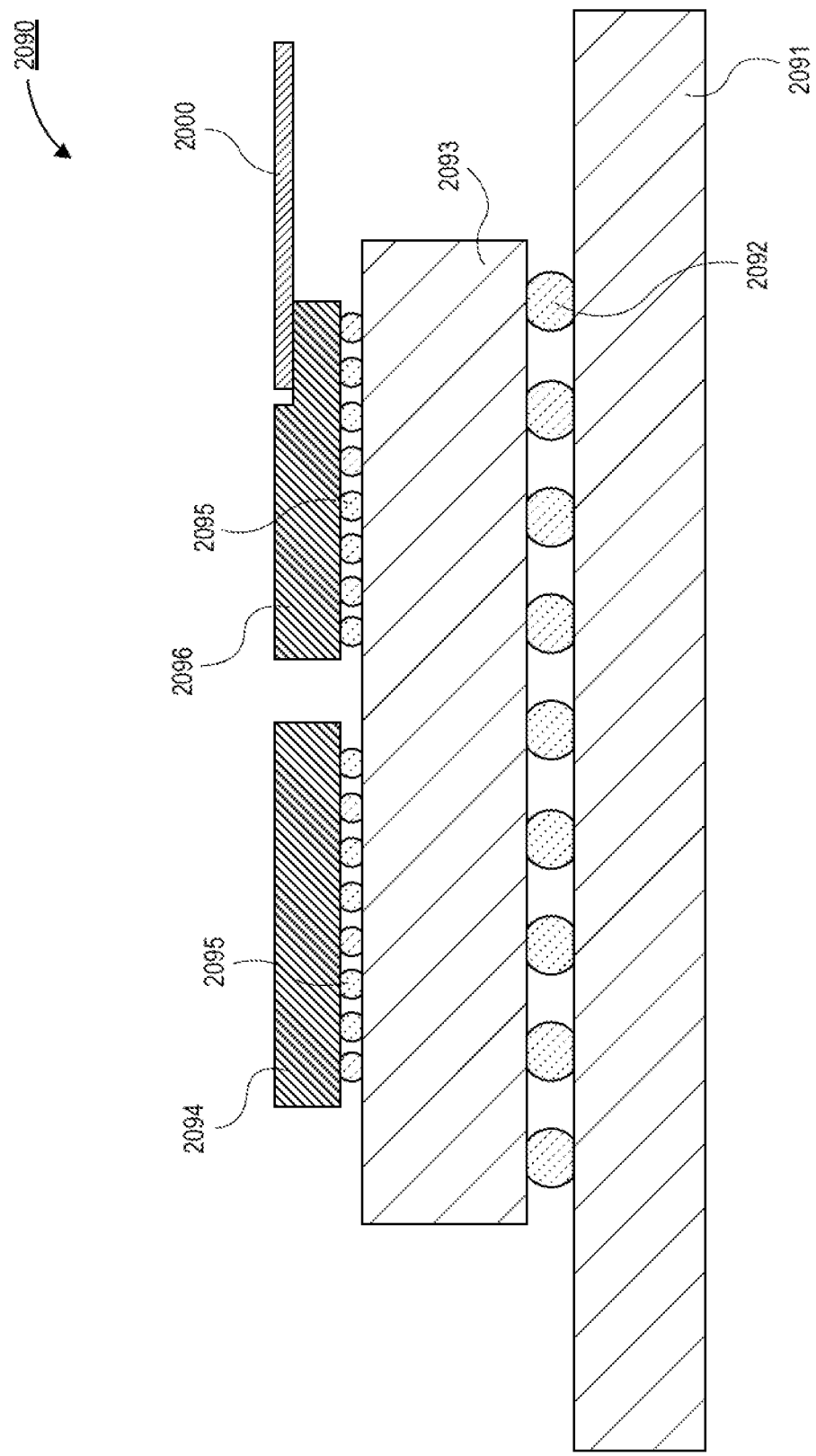
FIG. 20 is a cross-sectional illustration of an electronic system with a photonics integrated circuit (PIC) that is optically coupled to a PMF, in accordance with an embodiment.

Referring now to FIG. 20, a cross-sectional illustration of an electronic system 2090 is shown, in accordance with an embodiment. The electronic system 2090 comprises a board 2091, such as a printed circuit board (PCB). In an embodiment, a package substrate 2093 is coupled to the board 2091 by interconnects 2092. The interconnects 2092 are shown as solder balls, but it is to be appreciated that any interconnect architecture may be used. In an embodiment, a PIC 2093 is coupled to the package substrate 2093 by interconnects 2095. A PMF 2000 may be set into a groove on the PIC 2096. In an embodiment, the PMF 2000 may be similar to any of the PMFs described herein. In an embodiment, a die 2094 (e.g., a processor or the like) may be coupled to the PIC 2096 through the package substrate 2093.

Figure 21:
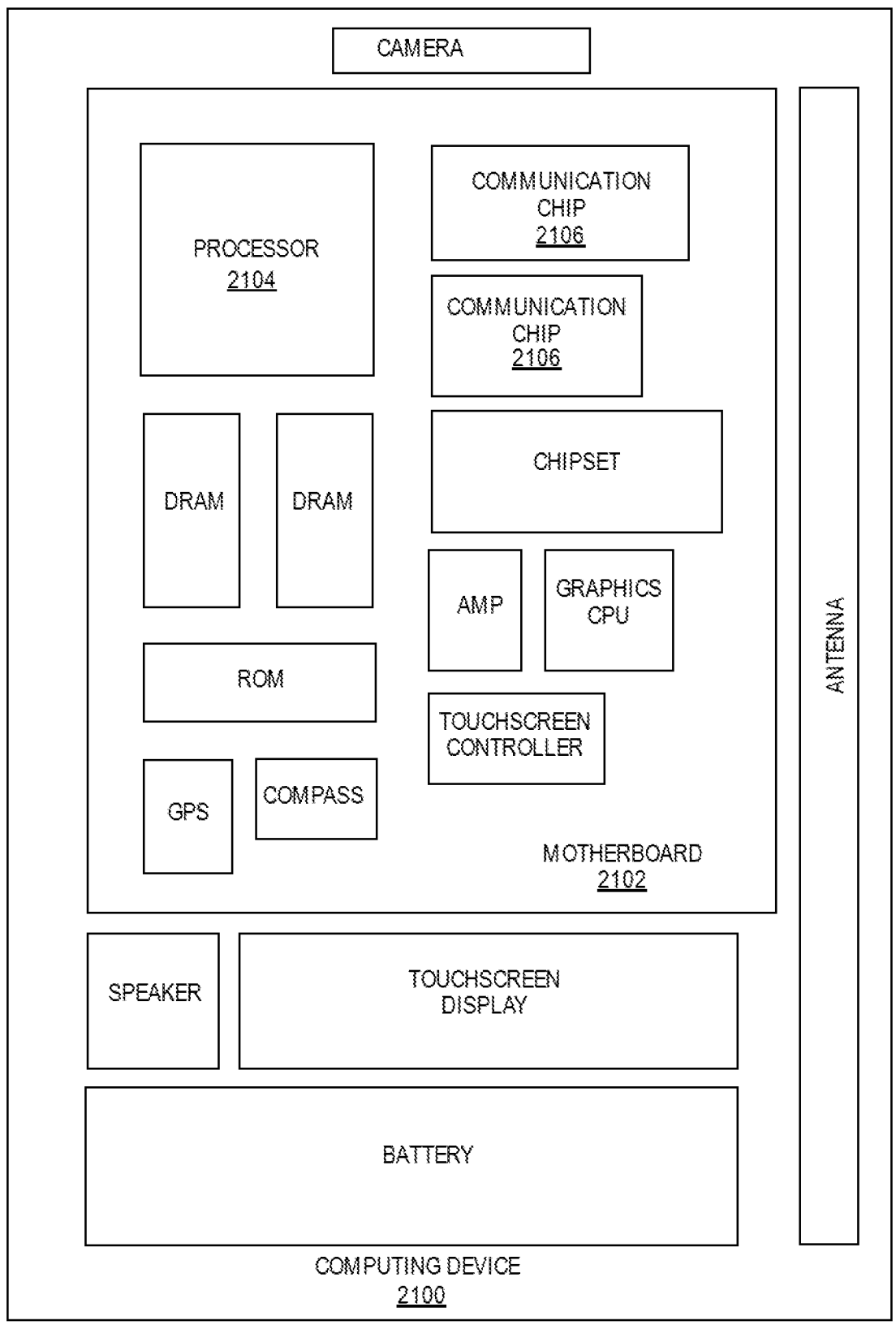
FIG. 21 is a schematic of a computing device built in accordance with an embodiment.

FIG. 21 illustrates a computing device 2100 in accordance with one implementation of the invention. The computing device 2100 houses a board 2102. The board 2102 may include a number of components, including but not limited to a processor 2104 and at least one communication chip 2106. The processor 2104 is physically and electrically coupled to the board 2102. In some implementations the at least one communication chip 2106 is also physically and electrically coupled to the board 2102. In further implementations, the communication chip 2106 is part of the processor 2104.

These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 2106 enables wireless communications for the transfer of data to and from the computing device 2100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 2106 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 2100 may include a plurality of communication chips 2106. For instance, a first communication chip 2106 may be dedicated to shorter range wireless communications such as Wi-Fi and Bluetooth and a second communication chip 2106 may be dedicated to longer range wireless communications such as GPS, EDGE, GPRS, CDMA, WiMAX, LTE, Ev-DO, and others.

The processor 2104 of the computing device 2100 includes an integrated circuit die packaged within the processor 2104. In some implementations of the invention, the integrated circuit die of the processor may be part of an electronic package that comprises a PIC with a fiber ribbon that includes aligned PMFs, in accordance with embodiments described herein. The term "processor" may refer to any device or portion of a device that processes electronic data from registers and/or memory to transform that electronic data into other electronic data that may be stored in registers and/or memory.

The communication chip 2106 also includes an integrated circuit die packaged within the communication chip 2106. In accordance with another implementation of the invention, the integrated circuit die of the communication chip may be part of an electronic package that comprises a PIC with a fiber ribbon that includes aligned PMFs, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1: an optical fiber comprising: a core; a cladding around the core; a first rod within the cladding and adjacent to the core, wherein the first rod comprises a magnetic material; and a second rod within the cladding and adjacent to the core, wherein the first rod and the second rod are on opposite sides of the core.

Example 2: the optical fiber of Example 1, wherein the second rod comprises a magnetic material.

Example 3: the optical fiber of Example 1 or Example 2, wherein the second rod comprises a material that is magnetically attracted to the first rod.

Example 4: the optical fiber of Examples 1-3, wherein the first rod and the second rod are cylindrical.

Example 5: the optic fiber of Examples 1-4, wherein the magnetic material comprises a magnetic powder.

Example 6: the optical fiber of Example 5, wherein the magnetic powder is mixed with a conductor.

Example 7: the optical fiber of Examples 1-6, further comprising: a third rod within the cladding and adjacent to the core; and a fourth rod within the cladding and adjacent to the core, wherein a line between the third rod and the fourth rod is substantially orthogonal to a line between the first rod and the second rod.

Example 8: the optical fiber of Example 7, wherein the third rod comprises a magnetic material.

Example 9: the optical fiber of Example 8, wherein the fourth rod comprises a magnetic material.

Example 10: a fiber ribbon, comprising: a plurality of optical fibers laterally adjacent to each other, wherein individual ones of the optical fibers comprise: a core; a cladding around the core; a first rod within the cladding and adjacent to the core, wherein the first rod comprises a magnetic material; and a second rod within the cladding and adjacent to the core, wherein the first rod and the second rod are on opposite sides of the core; and a mold material around the plurality of optical fibers, and wherein ends of the plurality of optical fibers extend past an end of the mold material.

Example 11: fiber ribbon of Example 10, wherein the plurality of optical fibers are aligned with each other so that the first rods and the second rods are all lined up with each other.

Example 12: the fiber ribbon of Example 11, wherein first rods are adjacent to second rods.

Example 13: the fiber ribbon of Examples 10-12, wherein the second rod comprises a magnetic material.

Example 14: the fiber ribbon of Examples 10-13, wherein the magnetic material comprises a magnetic powder.

Example 15: the fiber ribbon of Example 14, wherein the magnetic powder is mixed with a magnetic metal.

Example 16: the fiber ribbon of Examples 10-15, wherein the second rods comprises a material that is magnetically attracted to the first rods.

Example 17: the fiber ribbon of Examples 10-16, wherein the first rods and the second rods are cylindrical.

Example 18: an electronic package, comprising: a groove in a fiber array unit; a fiber in the groove, wherein the fiber comprises: a core; a cladding around the core; a first rod within the cladding and adjacent to the core, wherein the first rod comprises a magnetic material; and a second rod within the cladding and adjacent to the core, wherein the first rod and the second rod are on opposite sides of the core.

Example 19: the electronic package of Example 18, wherein the groove is a v-groove.

Example 20: the electronic package of Example 19, wherein the fiber is aligned in the v-groove by applying a magnetic field to the fiber.

Example 21: the electronic package of Examples 18-20, wherein the groove is a square groove with a bottom surface and a pair of sidewall surfaces.

Example 22: the electronic package of Example 21, wherein magnetic metal slugs are recessed into the pair of sidewall surfaces, and wherein the magnetic material is attracted to the magnetic metal slugs.

Example 23: an electronic system, comprising: a board; a package substrate coupled to the board; a photonics integrated circuit (PIC) coupled to the package substrate; and a polarization maintaining fiber (PMF) coupled to the PIC, wherein the PMF comprises: a core; a cladding around the core; a first rod within the cladding and adjacent to the core, wherein the first rod comprises a magnetic material; and a second rod within the cladding and adjacent to the core, wherein the first rod and the second rod are on opposite sides of the core.

Example 24: the electronic system of Example 23, wherein the second rod comprises a magnetic material.

Example 25: the electronic system of Example 23 or Example 24, wherein the second rod comprises a material that is magnetically attracted to the first rod.

Example 26: an optical fiber, comprising: a core; a first cladding around the core; a first rod within the first cladding and adjacent to the core; a second rod within the first cladding and adjacent to the core, wherein the first rod and the second rod are on opposite sides of the core; a second cladding around the first cladding; and a housing at least partially around a perimeter of the second cladding at an end of the optical fiber.

Example 27: the optical fiber of Example 26, wherein the second cladding is secured to the housing with an adhesive.

Example 28: the optical fiber of Example 26 or Example 27, wherein the second cladding comprises a first protrusion and a second protrusion, wherein the housing comprises a first groove and a second groove.

Example 29: the optical fiber of Example 28, wherein the first protrusion inserts into the first groove, and wherein the second protrusion inserts into the second groove.

Example 30: the optical fiber of Example 29 wherein the first protrusion is laterally adjacent to the first rod, and wherein the second protrusion is laterally adjacent to the second rod.

Example 31: the optical fiber of Examples 26-30, wherein the second cladding comprises a first groove and a second groove, wherein the housing comprises a first protrusion and a second protrusion.

Example 32: the optical fiber of Example 31, wherein the first protrusion inserts into the first groove, and wherein the second protrusion inserts into the second groove.

Example 33: the optical fiber of Example 32, wherein the first groove is laterally adjacent to the first rod, and wherein the second groove is laterally adjacent to the second rod.

Example 34: the optical fiber of Examples 26-33, wherein the housing comprises a latch.

Example 35: the optical fiber of Example 34, wherein the latch secures the optical fiber into a connector.

Example 36: the optical fiber of Example 35, wherein the connector is a linear connector.

Example 37: the optical fiber of Example 35, wherein the connector is an angled connector.

Example 38: the optical fiber module, comprising: a first polarization maintaining (PM) fiber; a first housing at an end of the first PM fiber; a connector, wherein the first housing is secured by a first end of the connector; a second PM fiber; a second housing at an end of the second PM fiber, wherein the second housing is secured by a second end of the connector.

Example 39: the optical fiber module of Example 38, wherein the connector is a linear connector.

Example 40: the optical fiber module of Example 38, wherein the connector is an angled connector.

Example 41: the optical fiber module of Example 40, wherein the connector comprises a mirror or prism to optically couple the first end of the connector to the second end of the connector.

Example 42: the optical fiber module of Examples 38-41, further comprising: a first lens within the connector and adjacent to the first end of the connector; and a second lens within the connector and adjacent to the second end of the connector.

Example 43: the optical fiber module of Examples 38-42, wherein the first housing aligns the first PM fiber with the connector and the second housing aligns the second PM fiber with the connector.

Example 44: the optical fiber module of Example 43, wherein the first housing and the second housing comprise protrusions that interface with grooves on the first PM fiber and the second PM fiber.

Example 45: the optical fiber module of Examples 38-44, wherein the first housing and the second housing comprise grooves that interface with protrusions on the first PM fiber and the second PM fiber.

Example 46: the optical fiber module of Examples 38-45, wherein the first housing is adhered to the first PM fiber with a first adhesive, and wherein the second housing is adhered to the second PM fiber with a second adhesive.

Example 47: the optical fiber module of Examples 38-46, wherein the first housing is secured to the first end of the connector by a first latching mechanism, and wherein the second housing is secured to the second end of the connector by a second latching mechanism.

Example 48: an electronic system, comprising: a board; a package substrate coupled to the board; a photonics integrated circuit (PIC) coupled to the package substrate; and a polarization maintaining fiber (PMF) coupled to the PIC, wherein the PMF comprises: a core; a first cladding around the core; a first rod within the first cladding and adjacent to the core; a second rod within the first cladding and adjacent to the core, wherein the first rod and the second rod are on opposite sides of the core; a second cladding around the first cladding; and a housing at least partially around a perimeter of the second cladding at an end of the PMF.

Example 49: the electronic system of Example 48, wherein the second cladding comprises protrusions that interface with grooves in the housing.

Example 50: the electronic system of Example 48 or Example 49, wherein the second cladding comprises grooves that interface with protrusions from the housing.

Example 51: a polarization maintaining fiber (PMF), comprising: a core; a first cladding around the core; a first rod within the cladding and adjacent to the core; a second rod within the cladding and adjacent to the core, wherein the first rod and the second rod are on opposite sides of the core; a second cladding around the first cladding; and an alignment feature integrated with the second cladding.

Example 52: the PMF of Example 51, wherein the alignment feature comprises a marking rod partially embedded in the second cladding.

Example 53: the PMF of Example 52, wherein the alignment feature further comprises a second marking rod partially embedded in the second cladding.

Example 54: the PMF of Example 52, wherein the alignment feature further comprises a groove in the second cladding, wherein the groove is on an opposite side of the second cladding from the marking rod.

Example 55: the PMF of Example 52, wherein the marking rod is a different material than the second cladding.

Example 56: the PMF of Example 52, wherein the marking rod is the same material as the first rod and the second rod.

Example 57: the PMF of Example 52, wherein the marking rod is circular.

Example 58: the PMF of Example 57, wherein a diameter of the marking rod is substantially similar to a diameter of the first rod.

Example 59: the PMF of Examples 51-58, wherein the alignment feature comprises a groove in the second cladding.

Example 60: the PMF of Example 59, wherein the alignment feature further comprises a second groove in the second cladding, wherein the second groove is on an opposite side of the second cladding from the groove.

Example 61: a fiber ribbon, comprising: a first polarization maintaining fiber (PMF), wherein the first PMF comprises a first alignment feature; a second PMF laterally adjacent to the first PMF, wherein the second PMF comprises a second alignment feature that interfaces with the first alignment feature in order to align the first PMF with the second PMF; and a mold material around the first PMF and the second PMF.

Example 62: the fiber ribbon of Example 61, wherein the first alignment feature is the same as the second alignment feature.

Example 63: the fiber ribbon of Example 62, wherein the first alignment feature comprises a protrusion and a groove, and wherein the protrusion and the groove are on opposite sides of the first PMF.

Example 64: the fiber ribbon of Examples 61-63, wherein the first alignment feature is different than the second alignment feature.

Example 65: the fiber ribbon of Example 64, wherein the first alignment feature comprises a first protrusion and a second protrusion, wherein the first protrusion and the second protrusion are on opposite sides of the first PMF, and wherein the second alignment feature comprises a first groove and a second groove, wherein the first groove and the second groove are on opposite sides of the second PMF.

Example 66: the fiber ribbon of Example 64, wherein the first alignment feature comprises a protrusion, and wherein the second alignment feature comprises a groove.

Example 67: the fiber ribbon of Examples 61-66, further comprising three or more PMFs.

Example 68: the fiber ribbon of Examples 61-67, wherein the first PMF and the second PMF each comprise: a core; a first cladding around the core; a first rod in the first cladding adjacent to the core; a second rod in the first cladding adjacent to the core, wherein the first rod and the second rod are on opposite sides of the core; and a second cladding around the first cladding.

Example 69: the fiber ribbon of Example 68, wherein the first rods and the second rods of the first PMF and the second PMF are aligned in a line.

Example 70: the fiber ribbon of Example 68, wherein the first alignment feature and the second alignment feature are formed on the second cladding.

Example 71: the fiber ribbon of Example 68, wherein the first alignment feature comprises a rod partially embedded in the second cladding.

Example 72: the fiber ribbon of Example 71, wherein the second alignment feature comprises a groove in the second cladding.

Example 73: the fiber ribbon of Example 71, wherein the first alignment feature further comprises a groove in the second cladding, wherein the groove is on an opposite side of the second cladding from the rod.

Example 74: an electronic package, comprising: a board; a package substrate coupled to the board; a photonics integrated circuit (PIC) coupled to the package substrate; and a fiber ribbon optically coupled to the PIC, wherein the fiber ribbon comprises: a first polarization maintaining fiber (PMF), wherein the first PMF comprises a first alignment feature; a second PMF laterally adjacent to the first PMF, wherein the second PMF comprises a second alignment feature that interfaces with the first alignment feature in order to align the first PMF with the second PMF; and a mold material around the first PMF and the second PMF.

Example 75: the electronic package of Example 74, wherein the first alignment feature is the same as the second alignment feature.

What is claimed is:

1. An optical fiber comprising:
a core;
a cladding around the core;
a first rod within the cladding and adjacent to the core, wherein the first rod comprises a magnetic material, the magnetic material comprising a magnetic powder mixed with a conductor; and
a second rod within the cladding and adjacent to the core, wherein the first rod and the second rod are on opposite sides of the core.

2. The optical fiber of claim 1, wherein the second rod comprises a magnetic material.

3. The optical fiber of claim 1, wherein the second rod comprises a material that is magnetically attracted to the first rod.

4. The optical fiber of claim 1, wherein the first rod and the second rod are cylindrical.

5. The optical fiber of claim 1, further comprising:
a third rod within the cladding and adjacent to the core; and
a fourth rod within the cladding and adjacent to the core, wherein a line between the third rod and the fourth rod is substantially orthogonal to a line between the first rod and the second rod.

6. The optical fiber of claim 5, wherein the third rod comprises a magnetic material.

7. The optical fiber of claim 6, wherein the fourth rod comprises a magnetic material.

8. A fiber ribbon, comprising:
a plurality of optical fibers laterally adjacent to each other, wherein individual ones of the optical fibers comprise:
a core;
a cladding around the core;
a first rod within the cladding and adjacent to the core, wherein the first rod comprises a magnetic material; and
a second rod within the cladding and adjacent to the core, wherein the first rod and the second rod are on opposite sides of the core; and
a mold material around the plurality of optical fibers, and wherein ends of the plurality of optical fibers extend past an end of the mold material.

9. The fiber ribbon of claim 8, wherein the plurality of optical fibers are aligned with each other so that the first rods and the second rods are all lined up with each other.

10. The fiber ribbon of claim 9, wherein first rods are adjacent to second rods.

11. The fiber ribbon of claim 8, wherein the second rod comprises a magnetic material.

12. The fiber ribbon of claim 8, wherein the magnetic material comprises a magnetic powder.

13. The fiber ribbon of claim 12, wherein the magnetic powder is mixed with a magnetic metal.

14. The fiber ribbon of claim 8, wherein the second rods comprises a material that is magnetically attracted to the first rods.

15. The fiber ribbon of claim 8, wherein the first rods and the second rods are cylindrical.

16. An electronic package, comprising:
a groove in a fiber array unit;
a fiber in the groove, wherein the fiber comprises:
a core;
a cladding around the core;
a first rod within the cladding and adjacent to the core, wherein the first rod comprises a magnetic material; and
a second rod within the cladding and adjacent to the core, wherein the first rod and the second rod are on opposite sides of the core.

17. The electronic package of claim 16, wherein the groove is a v-groove.

18. The electronic package of claim 17, wherein the fiber is aligned in the v-groove by applying a magnetic field to the fiber.

19. The electronic package of claim 16, wherein the groove is a square groove with a bottom surface and a pair of sidewall surfaces.

20. The electronic package of claim 19, wherein magnetic metal slugs are recessed into the pair of sidewall surfaces, and wherein the magnetic material is attracted to the magnetic metal slugs.

21. An electronic system, comprising:
a board;
a package substrate coupled to the board;
a photonics integrated circuit (PIC) coupled to the package substrate; and
a polarization maintaining fiber (PMF) coupled to the PIC, wherein the PMF comprises:
a core;
a cladding around the core;
a first rod within the cladding and adjacent to the core, wherein the first rod comprises a magnetic material; and
a second rod within the cladding and adjacent to the core, wherein the first rod and the second rod are on opposite sides of the core.

22. The electronic system of claim 21, wherein the second rod comprises a magnetic material.

23. The electronic system of claim 21, wherein the second rod comprises a material that is magnetically attracted to the first rod.

24. An optical fiber comprising:
a core;
a cladding around the core;
a first rod within the cladding and adjacent to the core, wherein the first rod comprises a magnetic material; and
a second rod within the cladding and adjacent to the core, wherein the first rod and the second rod are on opposite sides of the core, wherein the second rod comprises a material that is magnetically attracted to the first rod.

* * * * *